United States Patent
Li

(10) Patent No.: US 12,386,054 B2
(45) Date of Patent: Aug. 12, 2025

(54) BEAT FREQUENCY SIGNAL PROCESSING METHOD AND APPARATUS

(71) Applicant: SHENZHEN YINWANG INTELLIGENT TECHNOLOGIES CO., LTD., Shenzhen (CN)

(72) Inventor: Qiang Li, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 284 days.

(21) Appl. No.: 17/948,446

(22) Filed: Sep. 20, 2022

(65) Prior Publication Data
US 2023/0019007 A1    Jan. 19, 2023

Related U.S. Application Data

(63) Continuation of application No. PCT/CN2020/080510, filed on Mar. 20, 2020.

(51) Int. Cl.
*G01S 13/58* (2006.01)
*G01S 7/35* (2006.01)

(52) U.S. Cl.
CPC ............ *G01S 13/584* (2013.01); *G01S 7/356* (2021.05)

(58) Field of Classification Search
CPC ................................ G01S 13/584; G01S 7/356
(Continued)

(56) References Cited

U.S. PATENT DOCUMENTS 3,080,558 A * 3/1963 Meyer ....................... G01S 7/36
342/16
4,895,441 A * 1/1990 Allen, Jr. ................ G01S 13/34
367/101
(Continued)

FOREIGN PATENT DOCUMENTS

CN         1632474 A     6/2005
CN         101031814 A   9/2007
(Continued)

OTHER PUBLICATIONS

Hany A. Ahmed et al., "Novel technique for reducing effects of non-linear frequency sweeps in LFM ranging radars," 2009 4th International Design and Test Workshop (IDT), 5 pages.
(Continued)

*Primary Examiner* — Nuzhat Pervin
(74) *Attorney, Agent, or Firm* — Conley Rose, P.C.

(57) ABSTRACT

A beat frequency signal processing method includes determining a two-dimensional (2D) time frequency spectrogram of a beat frequency signal based on a sampled sequence of the beat frequency signal, where the 2D time frequency spectrogram indicates a relationship between a frequency and a time of the beat frequency signal; performing matching between the 2D time frequency spectrogram of the beat frequency signal and a plurality of theoretical 2D time frequency spectrograms to determine, as a target 2D time frequency spectrogram, a theoretical 2D time frequency spectrogram whose matching degree is greater than or equal to a preset threshold. The plurality of theoretical 2D time frequency spectrograms are 2D time frequency spectrograms of the beat frequency signal, under combinations of a plurality of flight times and a plurality of Doppler frequency offsets, that are calculated based on a frequency sweep curve of the frequency modulated signal.

21 Claims, 13 Drawing Sheets

(58) Field of Classification Search
USPC .......................................................... 342/109
See application file for complete search history.

(56) References Cited

U.S. PATENT DOCUMENTS

| | | | | |
|---|---|---|---|---|
| 5,940,024 | A * | 8/1999 | Takagi | G01S 13/345 |
| | | | | 342/128 |
| 10,101,456 | B2 * | 10/2018 | Baral-Baron | G01P 3/36 |
| 10,750,136 | B2 * | 8/2020 | Kaizu | G06T 5/50 |
| 11,520,024 | B2 * | 12/2022 | Yu | G01S 17/89 |
| 11,802,953 | B2 * | 10/2023 | Brown | G01S 13/34 |
| 2008/0043574 | A1 | 2/2008 | Rooney, III | G01S 7/524 |
| | | | | 367/87 |
| 2008/0088503 | A1 * | 4/2008 | Beasley | G01S 7/4056 |
| | | | | 342/200 |
| 2012/0112955 | A1 * | 5/2012 | Ando | G01S 13/931 |
| | | | | 342/159 |
| 2013/0214963 | A1 * | 8/2013 | Vacanti | G01S 7/354 |
| | | | | 342/120 |
| 2017/0016983 | A1 * | 1/2017 | Hoshuyama | G01S 7/354 |
| 2018/0183471 | A1 * | 6/2018 | Lin | G01S 13/348 |
| 2018/0329031 | A1 * | 11/2018 | Cheung | G01S 13/34 |
| 2019/0012999 | A1 * | 1/2019 | Niedermeier | G06F 16/683 |
| 2019/0383631 | A1 * | 12/2019 | Bigio | G06V 20/59 |
| 2020/0077892 | A1 * | 3/2020 | Tran | G08B 21/02 |
| 2020/0242373 | A1 * | 7/2020 | Mei | G01C 21/3833 |
| 2020/0300972 | A1 * | 9/2020 | Wang | A61B 5/0002 |
| 2021/0072362 | A1 * | 3/2021 | Gassend | G01S 7/4813 |
| 2021/0149037 | A1 * | 5/2021 | Choi | G01S 13/34 |
| 2021/0190938 | A1 * | 6/2021 | Que | G01S 13/87 |
| 2022/0179059 | A1 * | 6/2022 | Krogstad | G01S 13/536 |
| 2022/0268880 | A1 * | 8/2022 | Nakamura | G01S 13/931 |
| 2023/0401274 | A1 * | 12/2023 | Denninghoff | G06Q 30/0251 |

FOREIGN PATENT DOCUMENTS

| | | | | |
|---|---|---|---|---|
| CN | 102565780 | A | | 7/2012 |
| CN | 103297045 | A | | 9/2013 |
| CN | 104483667 | A | | 4/2015 |
| CN | 104635216 | A | | 5/2015 |
| CN | 104977566 | A * | 10/2015 | ............... G01S 7/02 |
| CN | 105006736 | A | | 10/2015 |
| CN | 110579746 | A | | 12/2019 |
| CN | 110632587 | A | | 12/2019 |
| CN | 110824493 | A | | 2/2020 |
| EP | 0518442 | A1 | | 12/1992 |
| JP | 4376390 | B2 | | 12/2009 |

OTHER PUBLICATIONS

Ke Jin et al., "A method for nonlinearity correction of wideband FMCW radar," 2016 CIE International Conference on Radar, Oct. 10, 2016, pp. 1-5, XP033161933, 5 pages.

* cited by examiner

BEAT FREQUENCY SIGNAL PROCESSING METHOD AND APPARATUS

CROSS-REFERENCE TO RELATED APPLICATIONS

This application is a continuation of International Patent Application No. PCT/CN2020/080510, filed on Mar. 20, 2020, which is hereby incorporated by reference in its entirety.

TECHNICAL FIELD

The present disclosure relates to the field of signal processing technologies, and in particular, to a beat frequency signal processing method and apparatus.

BACKGROUND

A frequency-modulated continuous wave (FMCW) radar system is a ranging device. FIG. 1 is a schematic diagram of a ranging principle of the FMCW radar system. As shown in FIG. 1, the FMCW radar system includes a frequency modulated signal generation module, a splitter, a frequency mixer, and an analog-to-digital converter (ADC). The ranging principle of the FMCW radar system is as follows: The frequency modulated signal generation module generates a frequency modulated radio frequency or laser signal (frequency modulated signal for short). The splitter splits the frequency modulated signal into two signals, where one signal serves as a local-frequency signal, and the other signal is transmitted to a target object under measurement and reflected by a surface of the target object to form an echo signal. The frequency mixer performs frequency mixing on the echo signal and the local-frequency signal to generate a beat frequency signal. Finally, the ADC converts the beat frequency signal from an analog signal to a digital signal to obtain a sampled sequence of the beat frequency signal. Fast Fourier transform (FFT) may be performed on the sampled sequence of the beat frequency signal to obtain a frequency of the beat frequency signal, and a speed and a distance of the target object can be calculated by using the frequency of the beat frequency signal. In practice, when the frequency modulated signal generation module performs frequency modulation, an increase and a decrease of a frequency of a frequency modulated signal cannot be strictly linear, but are in a curve. Therefore, a beat frequency signal is no longer a beat frequency signal with a single frequency, but is a signal whose frequency drifts with time. The nonlinearity of the frequency modulated signal seriously affects operating of the FMCW system. First, energy of the beat frequency signal is no longer concentrated at a single frequency, but diffuses to a range. As a result, it is difficult to detect an echo signal in a scenario with loud noise. Second, because the frequency of the beat frequency signal drifts with time, the frequency of the beat frequency signal cannot be accurately determined. This further affects a detection capability and accuracy of speed and distance estimation. Therefore, the nonlinearity of the frequency modulated signal needs to be corrected.

A conventional method for correcting nonlinearity of a frequency modulated signal includes: First, a frequency difference $e_k(t)$ between an actual output frequency $v_k(t)$ of the frequency modulated signal generation module during current measurement and an ideal linear frequency $v_d(t)$ is estimated, and a drive current $u_{k+1}(t)$ of the frequency modulated signal generation module during next measurement is adjusted by using the frequency difference $e_k(t)$, thereby changing an output frequency $v_{k+1}(t)$ of the frequency modulated signal generation module during the next measurement. After a plurality of rounds of iterative correction like this, an output frequency of the frequency modulated signal generation module finally tends to be linear.

In the foregoing method, a drive current estimated during previous measurement can be used only for next measurement. If an output frequency of the frequency modulated signal generation module during next measurement is controlled by using a drive current estimated during previous measurement and an output frequency value of the frequency modulated signal generation module does not match an expected frequency value due to interference from external factors such as a temperature and a vibration, the drive current estimated during the previous measurement becomes invalid, and an objective of iterative correction is not achieved. Therefore, nonlinearity of a frequency modulated signal still exists, and affects accuracy of estimating a speed and a distance of a target object.

SUMMARY

The present disclosure provides a beat frequency signal processing method and apparatus, to accurately estimate a speed and a distance of a target object when a frequency modulated signal is nonlinear, and improve accuracy of estimating the speed and the distance of the target object.

According to a first aspect, the present disclosure provides a beat frequency signal processing method, including: determining a two-dimensional (2D) time frequency spectrogram of a beat frequency signal based on a time domain signal of the beat frequency signal, where the time domain signal of the beat frequency signal is a sampled sequence of the beat frequency signal, and determining the 2D time frequency spectrogram of the beat frequency signal based on the sampled sequence of the beat frequency signal is equivalent to determining a relationship between a frequency and a time of the beat frequency signal, the beat frequency signal is a signal obtained by performing frequency mixing on a local-frequency signal and an echo signal, the local-frequency signal is one signal of a frequency modulated signal, the echo signal is a signal formed by reflecting another signal that is of the frequency modulated signal and that is transmitted to a target object, and the frequency modulated signal is a signal that is generated by a radar system and whose frequency is modulated; then performing matching between the 2D time frequency spectrogram of the beat frequency signal and a plurality of theoretical 2D time frequency spectrograms to determine a target 2D time frequency spectrogram, where the target 2D time frequency spectrogram is a theoretical 2D time frequency spectrogram whose matching degree is greater than or equal to a preset threshold among the plurality of theoretical 2D time frequency spectrograms, and the plurality of theoretical 2D time frequency spectrograms are 2D time frequency spectrograms of the beat frequency signal, under combinations of a plurality of flight times and a plurality of Doppler frequency offsets, that are calculated based on a frequency sweep curve of the frequency modulated signal; and finally, obtaining a distance and a speed of the target object based on a flight time and a Doppler frequency offset that correspond to the target 2D time frequency spectrogram. Because the target 2D time frequency spectrogram is obtained from the plurality of theoretical 2D time frequency spectrograms through matching based on the 2D time frequency spectrogram of the beat frequency signal, the target 2D time frequency spectrogram carries the corresponding flight time and Doppler frequency offset. Therefore, the distance and the speed of the target object may be obtained based on the flight time and the Doppler frequency offset that correspond to the target 2D time frequency spectrogram. According to the method in the present disclosure, the distance and the speed of the target object can be accurately obtained based on the time domain signal of the beat frequency signal, regardless of whether the frequency modulated signal is nonlinear and without being affected by external factors such as temperature and vibration. In this way, the speed and the distance of the target object are accurately estimated when the frequency modulated signal is nonlinear, and accuracy of estimating the speed and the distance of the target object is improved.

In a possible design, the determining a 2D time frequency spectrogram of a beat frequency signal based on a time domain signal of the beat frequency signal may be specifically: segmenting the time domain signal of the beat frequency signal to obtain N sequences, where N is a preset positive integer, N may be set based on linearity corresponding to a time when the frequency modulated signal is generated, and each sequence includes a plurality of sampling points; performing time frequency transform on each of the N sequences to obtain N frequency spectrograms, where the time frequency transform may be an FFT or a wavelet transform; and storing the N frequency spectrograms in a time sequence corresponding to the N sequences to obtain the 2D time frequency spectrogram of the beat frequency signal. Nonlinearity of the frequency modulated signal causes energy of the beat frequency signal to diffuse to a range, and further causes a frequency of the beat frequency signal to drift with time. Although the received beat frequency signal has nonlinearity, in this implementation, after the time domain signal of the beat frequency signal is split into the N sequences, duration of each sequence is short, and impact caused by nonlinearity of the beat frequency signal is greatly reduced. Therefore, the time frequency transform is performed on each sequence to obtain the N frequency spectrograms, and then the N frequency spectrograms are stored in the time sequence corresponding to the N sequences to obtain the 2D time frequency spectrogram of the beat frequency signal. In this way, the energy of the beat frequency signal can be concentrated in some time frequency cells, and diffusion of the energy of the beat frequency signal can be reduced, thereby improving accuracy of estimating the speed and the distance of the target object.

In a possible design, the segmenting the time domain signal of the beat frequency signal to obtain N sequences may be: segmenting the sampled sequence of the beat frequency signal to obtain N sequences $s_l(n)$, where the sequence is $s_l(n)=s[(l-1)\cdot M+n]$, $0 \le n < M$, $0 \le l < N$, M is a quantity of sampling points of one sequence $s_l(n)$, and M is a positive integer.

In a possible design, the performing time frequency transform on each of the N sequences to obtain N frequency spectrograms may be: performing FFT on each sequence $s_l(n)$ of the N sequences to obtain N frequency spectrograms $S_l(k)$, where $S_l(k)=F[s_l(n)]$, $0 \le k < M$, and $F[\ ]$ indicates an FFT operation; and the storing the N frequency spectrograms in a time sequence corresponding to the N sequences to obtain the 2D time frequency spectrogram of the beat frequency signal may be: storing the N frequency spectrograms $S_l(k)$ in the time sequence corresponding to the N sequences to obtain the 2D time frequency spectrogram T(l, k) of the beat frequency signal, where l is a time sequence number, and k is a frequency sequence number.

In this implementation, after the time domain signal of the beat frequency signal is split into the N sequences, duration of each sequence is short, and impact caused by nonlinearity of the beat frequency signal is greatly reduced. Therefore, FFT is performed on each sequence to obtain the N frequency spectrograms, and then the N frequency spectrograms are stored in the time sequence corresponding to the N sequences to obtain the 2D time frequency spectrogram of the beat frequency signal. In this way, the energy of the beat frequency signal can be concentrated in some time frequency cells, and diffusion of the energy of the beat frequency signal can be reduced, thereby improving accuracy of estimating the speed and the distance of the target object.

In a possible design, N is set based on linearity corresponding to a time when the frequency modulated signal is generated. Specifically, N may be set based on linearity of a frequency modulated signal generation module in a radar system, and a linearity degree is directly proportional to a value of N. In case of poor linearity, N may be set to be large. In case of high linearity, N may be set to be small.

In a possible design, the method may further include: first, determining combinations of a plurality of different flight times and a plurality of Doppler frequency offsets based on a measurable flight time range of the radar system and a preset first step and based on a measurable Doppler frequency offset range of the radar system and a preset second step, where the measurable flight time range of the radar system and the measurable Doppler frequency offset range of the radar system are prestored; then, calculating beat frequency curves $f_{best}(t, \tau, f_d)$ under the combinations of the plurality of flight times and the plurality of Doppler frequency offsets based on the frequency sweep curve $f_{est}(t)$ of the frequency modulated signal by using the following formula:

$$f_{best}(t,\tau,f_d)=f_{est}(t)-[f_{est}(t-\tau)+f_d],$$

where $\tau$ is the flight time, $f_d$ is the Doppler frequency offset, and it can be understood that a first combination of a flight time and a Doppler frequency offset may be determined first, then a beat frequency curve $f_{best}(t, \tau, f_d)$ under the first combination of the flight time and the Doppler frequency offset is calculated by using the foregoing formula, then a second combination of a flight time and a Doppler frequency offset is determined, and then a beat frequency curve $f_{best}(t, \tau, f_d)$ under the second combination of the flight time and the Doppler frequency offset is calculated by using the foregoing formula; and finally, converting each beat frequency curve $f_{best}(t, \tau, f_d)$ into a 2D time frequency spectrogram $M_{f_d,\tau}(l, k)$ whose size is $N_t \times N_f$ to obtain the plurality of theoretical 2D time frequency spectrograms $M_{f_d,\tau}(l, k)$, where $0 \le l < N_t$, $0 \le k < N_f$, l is a time sequence number, $N_t$ is a quantity of time sequence numbers, k is a frequency sequence number, and $N_f$ is a length of the frequency sequence number. The plurality of theoretical 2D time frequency spectrograms $M_{f_d,\tau}(l, k)$ are determined in the foregoing manner, and each theoretical 2D time frequency spectrogram carries a corresponding flight time and Doppler frequency offset, so that a theoretical 2D time frequency spectrogram whose matching degree with the 2D time frequency spectrogram of the beat frequency signal is greater than or equal to the preset threshold may be determined in the plurality of theoretical 2D time frequency spectrograms. Therefore, the distance and the speed of the target object may be obtained based on the flight time and the Doppler frequency offset that correspond to the target 2D time frequency spectrogram.

In a possible design, the performing matching between the 2D time frequency spectrogram of the beat frequency signal and a plurality of theoretical 2D time frequency spectrograms to determine a target 2D time frequency spectrogram may be: determining a matching degree between the 2D time frequency spectrogram of the beat frequency signal and each of the plurality of theoretical 2D time frequency spectrograms, and determining, as the target 2D time frequency spectrogram, a theoretical 2D time frequency spectrogram whose matching degree is greater than or equal to the preset threshold.

The following describes two possible manners of determining the matching degree.

In a possible design, the determining a matching degree between the 2D time frequency spectrogram of the beat frequency signal and each of the plurality of theoretical 2D time frequency spectrograms may be: first, performing size conversion on the 2D time frequency spectrogram T(l, k) of the beat frequency signal to obtain a 2D time frequency spectrogram $\hat{T}(l, k)$ of the beat frequency signal whose size is $N_t \times N_f$, where $0 \leq l < N_t$, $0 \leq k < N_f$, 1 is a time sequence number, $N_t$ is a quantity of time sequence numbers, k is a frequency sequence number, and $N_f$ is a length of the frequency sequence number; then, calculating, by using the following formula, a matching degree $M_{rf}(\tau, f_d)$ between each theoretical 2D time frequency spectrogram $M_{f_d,\tau}(l, k)$ and the size-converted 2D time frequency spectrogram $\hat{T}(l, k)$ of the beat frequency signal:

$$M_{rf}(\tau, f_d) = \sum_{k=0}^{N_f-1} \sum_{l=0}^{N_t-1} \hat{T}(l,k) \cdot M_{f_d,\tau}(l,k),$$

where the matching degree is a similarity degree between the 2D time frequency spectrogram $M_{f_d,\tau}(l, k)$ and the size-converted 2D time frequency spectrogram $\hat{T}(l, k)$ of the beat frequency signal, and the matching degree $M_{rf}(\tau, f_d)$ in the foregoing formula is a value obtained by multiplying amplitudes, corresponding to each time sequence number, of the 2D time frequency spectrogram $M_{f_d,\tau}(l, k)$ and the size-converted 2D time frequency spectrogram $\hat{T}(l, k)$ of the beat frequency signal, and then adding up obtained products; and finally, determining the calculated matching degree $M_{rf}(\tau, f_d)$ as the matching degree between the 2D time frequency spectrogram of the beat frequency signal and each of the plurality of theoretical 2D time frequency spectrograms.

In a possible design, the determining a matching degree between the 2D time frequency spectrogram of the beat frequency signal and each of the plurality of theoretical 2D time frequency spectrograms may be: first, calculating a frequency $f_{best}(l \cdot \Delta t, \tau, f_d)$ of each sequence corresponding to each beat frequency curve $f_{best}(t, \tau, f_d)$, where $\Delta t$ is duration of each sequence; then, converting the frequency $f_{best}(l \cdot \Delta t, \tau, f_d)$ of each sequence into an integer multiple of a frequency resolution $\Delta f$ of the 2D time frequency spectrogram T(l, k) of the beat frequency signal by using the following formula to obtain $k_{l,\tau,fd}$:

$k_{l,\tau,fd}$=round ($f_{best}$ (l·t, τ, fd)/Δf), where
Δf=1/Δt, and round( ) indicates rounding;
then, calculating a matching degree $Q_{rf}(\tau, f_d)$ between $k_{l,\tau,fd}$ and $f_d$, τ corresponding to each beat frequency curve $f_{best}(t, \tau, f_d)$ by using the following formula:

$$Q_{rf}(\tau, f_d) = \sum_{l=0}^{N_t} T(l, k_{l,\tau,fd}),$$

where in the foregoing formula, T(l, $k_{l,\tau,fd}$) is a 2D time frequency spectrogram whose time sequence number is l and whose frequency sequence number is $k_{l,\tau,fd}$, and the matching degree $Q_{rf}(\tau, f_d)$ is a value obtained by adding up N T(l, $k_{l,\tau,fd}$); and finally, determining the calculated matching degree Q(τ, $f_d$) as the matching degree between the 2D time frequency spectrogram of the beat frequency signal and each of the plurality of theoretical 2D time frequency spectrograms.

The frequency sweep curve $f_{est}(t)$ of the frequency modulated signal may be prestored, or may be measured in real time. The real-time measurement may be performing measurement by using a reference circuit. If real-time measurement is performed, in a possible design, the method further includes: performing phase estimation on the time domain signal of the beat frequency signal to obtain a phase sequence $\varphi_{ref}(n)$ of the beat frequency signal; and calculating the frequency sweep curve $f_{est}(n)$ of the frequency modulated signal based on the phase sequence $\varphi_{ref}(n)$ of the beat frequency signal by using the following formula:

$$f_{est}(n) = \varphi_{ref}(n)/2\pi\tau_{ref},$$

where $\tau_{ref}$ is a delay difference between two optical fibers in the radar system, and compared with prestoring, when real-time measurement is performed by using this method, measurement may be performed with changes of conditions such as temperature and humidity, and accuracy is higher.

In a possible design, the obtaining a distance and a speed of the target object based on a flight time and a Doppler frequency offset that correspond to the target 2D time frequency spectrogram may be: converting, based on a corresponding calculation formula, the flight time corresponding to the target 2D time frequency spectrogram into a value corresponding to a corresponding distance unit, to obtain the distance of the target object; and converting, based on a corresponding calculation formula, the Doppler frequency offset corresponding to the target 2D time frequency spectrogram into a value corresponding to a corresponding speed unit, to obtain the speed of the target object.

According to a second aspect, the present disclosure provides a beat frequency signal processing apparatus, including: a determining module configured to determine a 2D time frequency spectrogram of a beat frequency signal based on a time domain signal of the beat frequency signal, where the beat frequency signal is a signal obtained by performing frequency mixing on a local-frequency signal and an echo signal, the local-frequency signal is one signal of a frequency modulated signal, the echo signal is a signal formed by reflecting another signal that is of the frequency modulated signal and that is transmitted to a target object, the frequency modulated signal is a signal that is generated by a radar system and whose frequency is modulated, and the 2D time frequency spectrogram indicates a relationship between a frequency and a time of the beat frequency signal; a matching module configured to perform matching between the 2D time frequency spectrogram of the beat frequency signal and a plurality of theoretical 2D time frequency spectrograms to determine a target 2D time frequency spectrogram, where the target 2D time frequency spectrogram is a theoretical 2D time frequency spectrogram whose matching degree is greater than or equal to a preset threshold among the plurality of theoretical 2D time frequency spectrograms, and the plurality of theoretical 2D time frequency spectrograms are 2D time frequency spectrograms of the beat frequency signal, under combinations of a plurality of flight times and a plurality of Doppler frequency offsets, that are calculated based on a frequency sweep curve of the frequency modulated signal; and a first obtaining module configured to obtain a distance and a speed of the target object based on a flight time and a Doppler frequency offset that correspond to the target 2D time frequency spectrogram.

In a possible design, the determining module includes: a segmentation unit configured to segment the time domain signal of the beat frequency signal to obtain N sequences, where N is a preset positive integer, and each sequence includes a plurality of sampling points; a time frequency transform unit configured to perform time frequency transform on each of the N sequences to obtain N frequency spectrograms; and a storage unit configured to store the N frequency spectrograms in a time sequence corresponding to the N sequences to obtain the 2D time frequency spectrogram of the beat frequency signal.

In a possible design, the segmenting unit is further configured to: segment a sampled sequence of the beat frequency signal to obtain N sequences $s_l(n)$, where the sequence is $s_l(n)=s[(l-1)\cdot M+n]$, $0 \leq n < M$, $0 \leq l < N$, M is a quantity of sampling points of one sequence $s_l(n)$, and M is a positive integer.

In a possible design, the time frequency transform unit is further configured to: perform FFT on each sequence $s_l(n)$ of the N sequences to obtain N frequency spectrograms $S_l(k)$, where $S_l(k)=F[s_l(n)]$, $0 \leq k < M$, and $F[\ ]$ indicates an FFT operation; and the storage unit is further configured to store the N frequency spectrograms $S_l(k)$ in the time sequence corresponding to the N sequences to obtain the 2D time frequency spectrogram $T(l, k)$ of the beat frequency signal, where l is a time sequence number, and k is a frequency sequence number.

In a possible design, N is set based on linearity corresponding to a time when the frequency modulated signal is generated.

In a possible design, the beat frequency signal processing apparatus further includes: a second obtaining module configured to determine combinations of a plurality of different flight times and a plurality of Doppler frequency offsets based on a measurable flight time range of the radar system and a preset first step and based on a measurable Doppler frequency offset range of the radar system and a preset second step; a beat frequency curve calculation module configured to calculate beat frequency curves $f_{best}(t, \tau, f_d)$ under the combinations of the plurality of flight times and the plurality of Doppler frequency offsets based on the frequency sweep curve $f_{est}(t)$ of the frequency modulated signal by using the following formula:

$$f_{best}(t,\tau,f_d)=f_{est}(t)-[f_{est}(t-\tau)+f_d],$$

where $\tau$ is the flight time, and $f_d$ is the Doppler frequency offset; and a conversion module configured to convert each beat frequency curve $f_{best}(t, \tau, f_d)$ into a 2D time frequency spectrogram $M_{f_d,\tau}(l, k)$ whose size is $N_t \times N_f$ to obtain the plurality of theoretical 2D time frequency spectrograms $M_{f_d,\tau}(l, k)$, where $0 \leq l < N_t$, $0 \leq k < N_f$, l is a time sequence number, $N_t$ is a quantity of time sequence numbers, k is a frequency sequence number, and $N_f$ is a length of the frequency sequence number.

In a possible design, the matching module includes: a first determining unit configured to determine a matching degree between the 2D time frequency spectrogram of the beat frequency signal and each of the plurality of theoretical 2D time frequency spectrograms; and a second determining unit configured to determine, as the target 2D time frequency spectrogram, a theoretical 2D time frequency spectrogram whose matching degree is greater than or equal to the preset threshold.

In a possible design, the first determining unit is further configured to: perform size conversion on the 2D time frequency spectrogram $T(l, k)$ of the beat frequency signal to obtain a 2D time frequency spectrogram $\hat{T}(l, k)$ of the beat frequency signal whose size is $N_t \times N_f$, where $0 \leq l < N_t$, $0 \leq k < N_f$, l is a time sequence number, $N_t$ is a quantity of time sequence numbers, k is a frequency sequence number, and $N_f$ is a length of the frequency sequence number; calculate, by using the following formula, a matching degree $M_{rf}(\tau, f_d)$ between each theoretical 2D time frequency spectrogram $M_{f_d,\tau}(l, k)$ and the size-converted 2D time frequency spectrogram $\hat{T}(l, k)$ of the beat frequency signal:

$$M_{rf}(\tau,f_d)=\Sigma_{k=0}^{N_f-1}\Sigma_{l=0}^{N_t-1}\hat{T}(l,k)\cdot M_{f_d,\tau}(l,k);$$

and determine the calculated matching degree $M_{rf}(\tau, f_d)$ as the matching degree between the 2D time frequency spectrogram of the beat frequency signal and each of the plurality of theoretical 2D time frequency spectrograms.

In a possible design, the first determining unit is further configured to: calculate a frequency $f_{best}(l \cdot \Delta t, \tau, f_d)$ of each sequence corresponding to each beat frequency curve $f_{best}(t, \tau, f_d)$, where $\Delta t$ is duration of each sequence; convert the frequency $f_{best}(l \cdot \Delta t, \tau, f_d)$ of each sequence into an integer multiple of a frequency resolution $\Delta f$ of the 2D time frequency spectrogram $T(l, k)$ of the beat frequency signal by using the following formula to obtain $k_{l,\tau,fd}$:

$$k_{l,\tau,fd}=\text{round}(f_{best}(l \cdot \Delta t,\tau,fd)/\Delta f),$$

where $\Delta f=1/\Delta t$, and round( ) indicates rounding; calculate a matching degree $Q_{rf}(\tau, f_d)$ between $k_{l,\tau,fd}$ and $f_d$, $\tau$ corresponding to each beat frequency curve $f_{best}(t, \tau, f_d)$ by using the following formula:

$$Q_{rf}(\tau,f_d)=\Sigma_{l=0}^{N}T(l,k_{l,\tau,fd});$$

and determine the calculated matching degree $Q(\tau, f_d)$ as the matching degree between the 2D time frequency spectrogram of the beat frequency signal and each of the plurality of theoretical 2D time frequency spectrograms.

In a possible design, the beat frequency signal processing apparatus further includes: a frequency sweep curve calculation module configured to: perform phase estimation on the time domain signal of the beat frequency signal to obtain a phase sequence $\varphi_{ref}(n)$ of the beat frequency signal; and calculate the frequency sweep curve $f_{est}(n)$ of the frequency modulated signal based on the phase sequence $\varphi_{ref}(n)$ of the beat frequency signal by using the following formula:

$$f_{est}(n)=\varphi_{ref}(n)/2\pi\tau_{ref},$$

where $\tau_{ref}$ is a delay difference between two optical fibers in the radar system.

In a possible design, the first obtaining module is configured to: obtain the distance of the target object based on the flight time corresponding to the target 2D time frequency spectrogram, and obtain the speed of the target object based on the Doppler frequency offset corresponding to the target 2D time frequency spectrogram.

For beneficial effects of the beat frequency signal processing apparatus provided in the second aspect and the possible designs of the second aspect, refer to the beneficial effects of the first aspect and the possible implementations of the first aspect. Details are not described herein again.

According to a third aspect, the present disclosure provides a beat frequency signal processing apparatus, including a memory and a processor, where the memory is configured to store program instructions; and the processor is configured to: when the program instructions in the memory are invoked and executed, perform the beat frequency signal processing method in any one of the first aspect or the possible designs of the first aspect.

According to a fourth aspect, the present disclosure provides a readable storage medium. The readable storage medium stores executable instructions. When at least one processor of a beat frequency signal processing apparatus executes the executable instructions, the beat frequency signal processing apparatus performs the method in any one of the first aspect or the possible designs of the first aspect.

According to a fifth aspect, the present disclosure provides a chip. The chip includes a programmable logic circuit. When the chip is run, the programmable logic circuit is configured to implement the beat frequency signal processing method in any one of the first aspect or the possible designs of the first aspect.

According to a sixth aspect, the present disclosure provides a radar, including: a transmitter configured to transmit a detection signal to a target object; and a receiver configured to receive an echo signal formed through reflection by the target object; and the beat frequency signal processing apparatus in any one of the first aspect or the possible designs of the first aspect.

DESCRIPTION OF EMBODIMENTS

Figure 1:
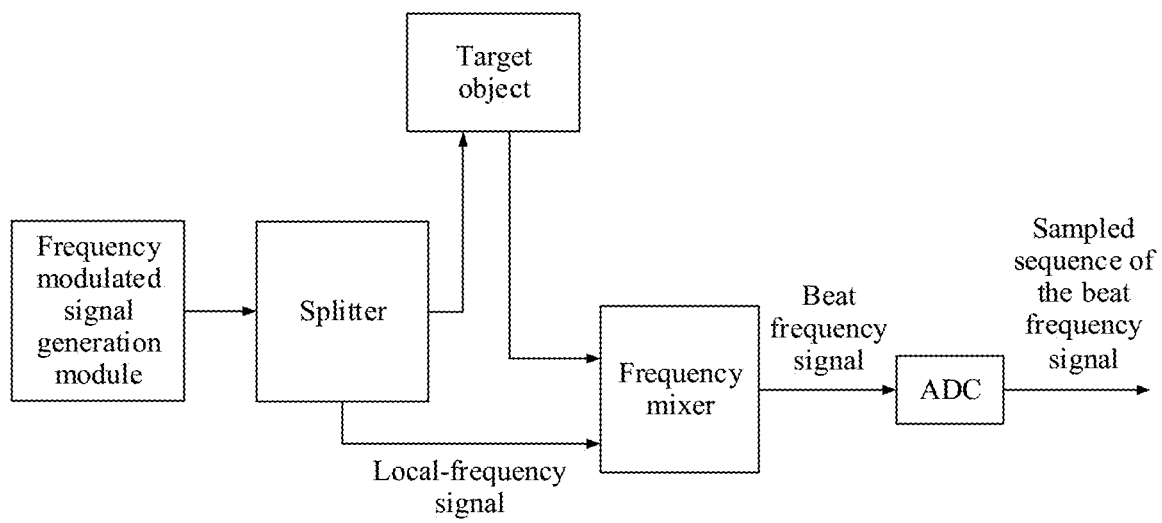
FIG. 1 is a schematic diagram of a ranging principle of an FMCW radar system.

In embodiments of the present disclosure, terms such as "example" or "for example" are used to represent an example, an illustration, or a description. Any embodiment or solution described by using "example" or "for example" in embodiments of the present disclosure should not be construed as being more preferred or having more advantages than another embodiment or solution. Exactly, use of the word "example", "for example", or the like is intended to present a related concept in a specific manner.

In the present disclosure, at least one means one or more, and a plurality of means two or more. And/or describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects.

During operating of a radar system, nonlinearity of a frequency modulated signal seriously affects the operating of the radar system. As a result, energy of a beat frequency signal diffuses to a range, and it is difficult to detect an echo signal in a scenario with loud noise. In addition, a frequency of the beat frequency signal drifts with time, and therefore the frequency of the beat frequency signal cannot be accurately determined. This further affects a detection capability and accuracy of speed and distance estimation. Therefore, the nonlinearity of the frequency modulated signal needs to be corrected. In a conventional technology, nonlinearity of a frequency modulated signal is corrected by using a plurality of rounds of iterative correction. The iterative correction may fail due to interference from external factors such as temperature and vibration. Therefore, the nonlinearity of the frequency modulated signal still exists, and affects accuracy of estimating a speed and a distance of a target object. To resolve this problem, the present disclosure provides a beat frequency signal processing method and apparatus. First, a 2D time frequency spectrogram of a beat frequency signal is determined based on a time domain signal of the beat frequency signal, that is, a relationship between a frequency and a time of the beat frequency signal is determined. Then matching is performed between the 2D time frequency spectrogram of the beat frequency signal and a plurality of theoretical 2D time frequency spectrograms, and a theoretical 2D time frequency spectrogram whose matching degree is greater than or equal to a preset threshold among the plurality of theoretical 2D time frequency spectrograms is determined as a target 2D time frequency spectrogram, where the plurality of theoretical 2D time frequency spectrograms are 2D time frequency spectrograms of the beat frequency signal, under combinations of a plurality of flight times and a plurality of Doppler frequency offsets, that are calculated based on a frequency sweep curve of the frequency modulated signal. Finally, a distance of a target object is obtained based on a flight time corresponding to the target 2D time frequency spectrogram, and a speed of the target object is obtained based on a Doppler frequency offset corresponding to the target 2D time frequency spectrogram. In the present disclosure, because the target 2D time frequency spectrogram is obtained from the plurality of theoretical 2D time frequency spectrograms through matching based on the 2D time frequency spectrogram of the beat frequency signal, the target 2D time frequency spectrogram carries the corresponding flight time and Doppler frequency offset. Therefore, the distance and the speed of the target object may be obtained based on the flight time and the Doppler frequency offset that correspond to the target 2D time frequency spectrogram. According to the foregoing method, the distance and the speed of the target object can be accurately obtained based on the time domain signal of the beat frequency signal, regardless of whether the frequency modulated signal is nonlinear and without being affected by external factors such as temperature and vibration. In this way, the speed and the distance of the target object are accurately estimated when the frequency modulated signal is nonlinear, and accuracy of estimating the speed and the distance of the target object is improved. The following describes in detail the beat frequency signal processing method and apparatus provided in the present disclosure with reference to accompanying drawings.

First, related terms included in the present disclosure are described for ease of understanding.

1. Frequency modulated signal: A frequency modulated signal is a signal that is generated by a radar system and whose frequency is modulated.

2. Beat frequency signal: As shown in FIG. 1, a beat frequency signal is a signal obtained by performing frequency mixing on a local-frequency signal and an echo signal. A splitter splits a frequency modulated signal into two signals, where the local-frequency signal is one signal of the frequency modulated signal, and the echo signal is a signal formed by reflecting another signal that is of the frequency modulated signal and that is transmitted to a target object.

3. Time domain signal of a beat frequency signal: As shown in FIG. 1, a time domain signal of a beat frequency signal is a sampled sequence of the beat frequency signal that is obtained through conversion by an ADC.

4. A frequency sweep curve of a frequency modulated signal is a true curve that indicates a frequency of the frequency modulated signal changing with time.

5. A beat frequency curve is a curve that is calculated based on a frequency sweep curve of a frequency modulated signal and that indicates a beat frequency signal changing with time under a combination of a flight time and a Doppler frequency offset.

Figure 2:
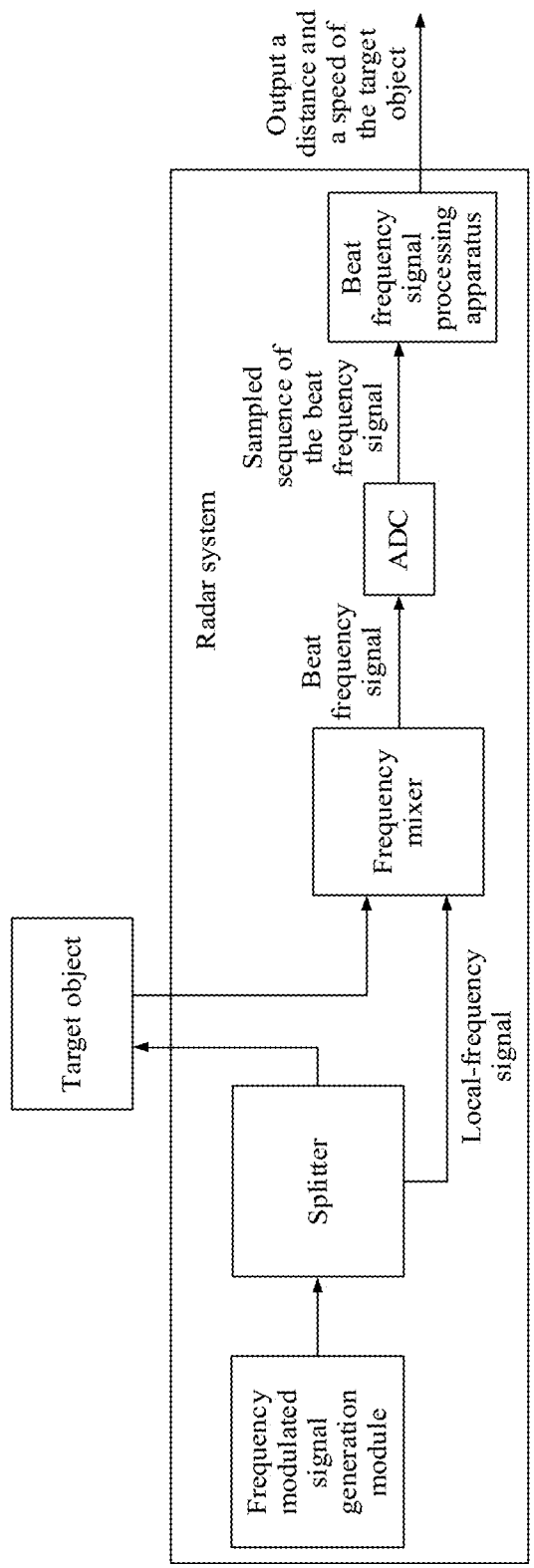
FIG. 2 is a schematic diagram of an application scenario according to an embodiment of the present disclosure.
Figure 3:
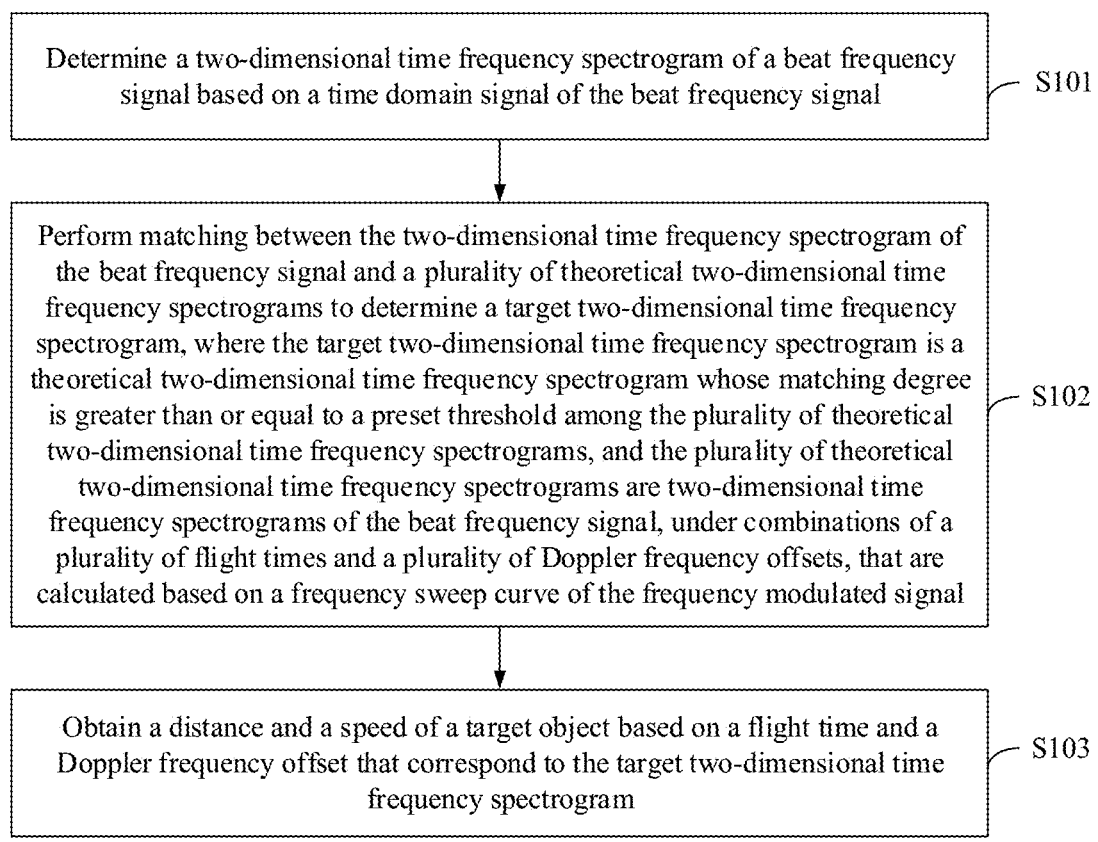
FIG. 3 is a flowchart of an embodiment of a beat frequency signal processing method according to an embodiment of the present disclosure.

The beat frequency signal processing method provided in the present disclosure may be applied to a field-programmable gate array (FPGA) or an application-specific integrated circuit (ASIC) chip. FIG. 2 is a schematic diagram of an application scenario according to the present disclosure. As shown in FIG. 2, a radar system may include a frequency modulated signal generation module, a splitter, a frequency mixer, an ADC, and a beat frequency signal processing apparatus. When the radar system performs detection on a target object, the frequency modulated signal generation module generates a frequency modulated signal. The splitter splits the frequency modulated signal into two signals, where one signal is a local-frequency signal, and the other signal is transmitted to the target object and reflected to form an echo signal. The frequency mixer performs frequency mixing on the echo signal and the local-frequency signal to generate a beat frequency signal. Finally, the ADC converts the beat frequency signal from an analog signal into a digital signal to obtain a sampled sequence of the beat frequency signal. The beat frequency signal processing apparatus implements the method in the present disclosure to process the sampled sequence of the beat frequency signal, and outputs a distance and a speed of the target object. The beat frequency signal processing apparatus may be an FPGA or an ASIC. It should be noted that the structure of the radar system shown in FIG. 2 is merely an example. With reference to FIG. 3, the following describes in detail a process of processing the beat frequency signal by the beat frequency signal processing apparatus.

FIG. 3 is a flowchart of an embodiment of a beat frequency signal processing method according to the present disclosure. The method shown in FIG. 3 may be performed by the beat frequency signal processing apparatus in FIG. 2. As shown in FIG. 3, the method in this embodiment may include the following steps.

S101: Determine a 2D time frequency spectrogram of a beat frequency signal based on a time domain signal of the beat frequency signal, where the beat frequency signal is a signal obtained by performing frequency mixing on a local-frequency signal and an echo signal, the local-frequency signal is one signal of a frequency modulated signal, the echo signal is a signal formed by reflecting another signal that is of the frequency modulated signal and that is transmitted to a target object, the frequency modulated signal is a signal that is generated by a radar system and whose frequency is modulated, and the 2D time frequency spectrogram indicates a relationship between a frequency and a time of the beat frequency signal.

Specifically, the time domain signal of the beat frequency signal is a sampled sequence of the beat frequency signal, and determining the 2D time frequency spectrogram of the beat frequency signal based on the sampled sequence of the beat frequency signal is equivalent to determining the relationship between the frequency and the time of the beat frequency signal.

In an implementable manner, the determining a 2D time frequency spectrogram of a beat frequency signal based on a time domain signal of the beat frequency signal may be specifically as follows.

S1011: Segment the time domain signal of the beat frequency signal to obtain N sequences, where N is a preset positive integer, and each sequence includes a plurality of sampling points.

N is set based on linearity corresponding to a time when the frequency modulated signal is generated. Specifically, N may be set based on linearity of a frequency modulated signal generation module in the radar system, a linearity degree is directly proportional to a value of N, and a quantity of sampling points included in each sequence varies with the value of N. For example, if the sampled sequence of the beat frequency signal includes a total of 20000 sampling points and N is 100, 100 sequences may be obtained, and each sequence includes 200 sampling points.

S1012: Perform time frequency transform on each of the N sequences to obtain N frequency spectrograms.

Specifically, the time frequency transform may be FFT or wavelet transform.

S1013: Store the N frequency spectrograms in a time sequence corresponding to the N sequences to obtain the 2D time frequency spectrogram of the beat frequency signal.

In this embodiment, the time domain signal of the received beat frequency signal is split into the N sequences to perform time frequency transform processing. Nonlinearity of the frequency modulated signal causes energy of the beat frequency signal to diffuse to a range, and further causes a frequency of the beat frequency signal to drift with time. Although the received beat frequency signal has nonlinearity, after the time domain signal of the beat frequency signal is split into the N sequences, duration of each sequence is short, and impact caused by nonlinearity of the beat frequency signal is greatly reduced. Therefore, the time frequency transform is performed on each sequence to obtain the N frequency spectrograms, and then the N frequency spectrograms are stored in the time sequence corresponding to the N sequences to obtain the 2D time frequency spectrogram of the beat frequency signal. In this way, the energy of the beat frequency signal can be concentrated in some time frequency cells, and diffusion of the energy of the beat frequency signal can be reduced, thereby improving accuracy of estimating the speed and the distance of the target object.

Specifically, in an implementable manner, S1011 may be specifically: segmenting the sampled sequence of the beat frequency signal to obtain N sequences $s_l(n)$, where the sequence is $s_l(n)=s[(l-1)\cdot M+n]$, $0 \leq n < M$, $0 \leq l < N$, M is a quantity of sampling points of one sequence $s_l(n)$, and M is a positive integer. For example, if the sampled sequence of the beat frequency signal includes a total of 20000 sampling points and N is 100, M is 200.

Correspondingly, S1012 may be specifically: performing FFT on each sequence $s_l(n)$ of the N sequences to obtain N frequency spectrograms $S_l(k)$, where $S_l(k)=F[s_l(n)]$, $0 \leq k < M$, and F[ ] indicates an FFT operation.

Correspondingly, S1013 may be specifically: storing the N frequency spectrograms $S_l(k)$ in the time sequence corresponding to the N sequences to obtain the 2D time frequency spectrogram T(l, k) of the beat frequency signal, where l is a time sequence number, and k is a frequency sequence number.

S102: Perform matching between the 2D time frequency spectrogram of the beat frequency signal and a plurality of theoretical 2D time frequency spectrograms to determine a target 2D time frequency spectrogram, where the target 2D time frequency spectrogram is a theoretical 2D time frequency spectrogram whose matching degree is greater than or equal to a preset threshold among the plurality of theoretical 2D time frequency spectrograms, and the plurality of theoretical 2D time frequency spectrograms are 2D time frequency spectrograms of the beat frequency signal, under combinations of a plurality of flight times and a plurality of Doppler frequency offsets, that are calculated based on a frequency sweep curve of the frequency modulated signal.

Specifically, matching is performed between the 2D time frequency spectrogram of the beat frequency signal and the plurality of theoretical 2D time frequency spectrograms, where the plurality of theoretical 2D time frequency spectrograms may be calculated based on the frequency sweep curve of the frequency modulated signal and prestored, or may be calculated in real time. The following provides an implementable calculation manner. If real-time calculation is performed, before S102, the method in this embodiment may further include the following step:

S104: Calculate beat frequency curves under the combinations of the plurality of flight times and the plurality of Doppler frequency offsets based on the frequency sweep curve of the frequency modulated signal, a measurable flight time range of the radar system and a preset first step, and a measurable Doppler frequency offset range of the radar system and a preset second step.

Specifically, S104 may be as follows:

S1041: Determine the combinations of the plurality of different flight times and the plurality of Doppler frequency offsets based on the measurable flight time range of the radar system and the preset first step and based on the measurable Doppler frequency offset range of the radar system and the preset second step.

The measurable flight time range of the radar system and the measurable Doppler frequency offset range of the radar system are prestored. For example, a measurable distance range of the radar system is 0 to 300 meters, and the distance range corresponds to the flight time range. Therefore, the measurable flight time range of the radar system may be determined. For example, the flight time range is 0 to 2 microseconds (µs). The Doppler frequency offset range corresponds to a speed range. For example, it may be determined, based on a speed range to be measured, that the Doppler frequency offset range is 0 to 100 megahertz (MHz). The first step and the second step may be determined based on processing complexity and performance of the beat frequency signal processing apparatus in the present disclosure.

For example, the measurable flight time range of the radar system is 0 to 2 µs, the measurable Doppler frequency offset range of the radar system is 0 to 100 MHz, the first step is set to 1 µs, and the second step is set to 50 MHz. In this case, combinations of flight times and Doppler frequency offsets that are determined based on the measurable flight time range of the radar system and the first step and based on the measurable Doppler frequency offset range of the radar system and the second step may be: (0, 0), (0, 50 MHz), (0, 100 MHz), (1 µs, 0), (1 µs, 50 MHz), (1 µs, 100 MHz), (2 µs, 0), (2 µs, 50 MHz), and (2 µs, 100 MHz).

S1042: Calculate the beat frequency curves $f_{best}(t, \tau, f_d)$ under the combinations of the plurality of flight times and the plurality of Doppler frequency offsets based on the frequency sweep curve $f_{est}(t)$ of the frequency modulated signal by using the following formula:

$$f_{best}(t,\tau,f_d)=f_{est}(t)-[f_{est}(t-\tau)+f_d],$$

where $\tau$ is the flight time, and $f_d$ is the Doppler frequency offset.

It can be understood that S1041 may be performed before S1042, or S1041 and S1042 may be performed simultaneously. To be specific, a first combination of a flight time and a Doppler frequency offset is determined first, then a beat frequency curve $f_{best}(t, \tau, f_d)$ under the first combination of the flight time and the Doppler frequency offset is calculated by using S1042, then a second combination of a flight time and a Doppler frequency offset is determined, and then a beat frequency curve $f_{best}(t, \tau, fd)$ under the second combination of the flight time and the Doppler frequency offset is calculated by using S1042.

The frequency sweep curve $f_{est}(t)$ of the frequency modulated signal may be prestored. Specifically, before the frequency modulated signal generation module in the radar system is delivered out of a factory, the frequency sweep curve of the frequency modulated signal output by the frequency modulated signal generation module is detected by a test apparatus, for example, a spectrogram analyzer, and then stored. Alternatively, the frequency sweep curve $f_{est}(t)$ of the frequency modulated signal may be measured in real time. The real-time measurement may be performing measurement by using a reference circuit. If real-time measurement is performed, before S1042, the method in this embodiment may further include: first, performing phase estimation on the time domain signal of the beat frequency signal to obtain a phase sequence $\varphi_{ref}(n)$ of the beat frequency signal; and then calculating the frequency sweep curve $f_{est}(n)$ of the frequency modulated signal based on the phase sequence $\varphi_{ref}(n)$ of the beat frequency signal by using the following formula:

$$f_{est}(n)=\varphi_{ref}(n)/2\pi\tau_{ref},$$

where $\tau_{ref}$ is a delay difference between two optical fibers in the radar system. Specifically, energy of the frequency modulated signal may be split into two parts, and each part of signal is introduced into the two optical fibers with different delays to obtain two laser signals with different delays. Then a frequency mixer performs frequency mixing on the two laser signals with different delays to obtain the beat frequency signal, and an ADC performs sampling to obtain the time domain signal of the beat frequency signal, where the delay difference $\tau_{ref}$ between the two optical fibers is known. Then phase estimation is performed on the time domain signal of the beat frequency signal to obtain the phase sequence $\varphi_{ref}(n)$ of the beat frequency signal. Finally, the frequency sweep curve $f_{est}(n)$ of the frequency modulated signal is calculated by using the following formula: $f_{est}(n)=\varphi_{ref}(n)/2\pi\tau_{ref}$. Alternatively, the frequency sweep curve $f_{est}(n)$ of the frequency modulated signal may be measured by using this method and then stored. Compared with prestoring, when real-time measurement is performed by using this method, measurement may be performed with changes of conditions such as temperature and humidity, and accuracy is higher. However, calculation complexity of prestoring is lower.

S1043: Convert each beat frequency curve $f_{best}(t, \tau, f_d)$ into a 2D time frequency spectrogram $M_{f_d,\tau}(l, k)$ whose size is $N_t \times N_f$ to obtain the plurality of theoretical 2D time frequency spectrograms $M_{f_d,\tau}(l, k)$, where $0 \leq l < N_t$, $0 \leq k < N_f$, l is a time sequence number, $N_t$ is a quantity of time sequence numbers, k is a frequency sequence number, and $N_f$ is a length of the frequency sequence number.

Specifically, the beat frequency curve $f_{best}(t, \tau, f_d)$ is obtained in S1041 and S1042. In an implementable manner, the converting each beat frequency curve $f_{best}(t, \tau, f_d)$ into a 2D time frequency spectrogram $M_{f_d,\tau}(l, k)$ whose size is $N_t \times N_f$ may be specifically: first, calculating a frequency resolution of the 2D time frequency spectrogram: $\Delta f = W/N_f$, where W herein is a preset frequency domain display range of the 2D time frequency spectrogram, and calculating a time domain resolution $\Delta t = T/N_t$ of the 2D time frequency spectrogram, where T herein is a preset time display range of the 2D time frequency spectrogram; then calculating a value of the beat frequency curve $f_{best}(t, \tau, f_d)$ at a time point $n\Delta t$, where $0 \leq n < N_t$, to obtain a sequence $f_{best}(n\Delta t, \tau, f_d)$ whose length is $N_t$, and then performing the following calculation on each sampling point $f_{best}(n\Delta t, \tau, f_d)$ in the sequence: $u[n]=\text{round}(f_{best}(n\Delta t, \tau, f_d)/\Delta f)$, where round herein indicates a rounding operation; and generating a 2D matrix, and setting a cell whose row number is $u[n]$ and column number is n to 1 and other cells to 0, to obtain the 2D time frequency spectrogram $M_{f_d,\tau}(l, k)$.

In this embodiment, the performing matching between the 2D time frequency spectrogram of the beat frequency signal and a plurality of theoretical 2D time frequency spectrograms to determine a target 2D time frequency spectrogram may be specifically as follows:

S1021: Determine a matching degree between the 2D time frequency spectrogram of the beat frequency signal and each of the plurality of theoretical 2D time frequency spectrograms.

Specifically, the determining a matching degree between the 2D time frequency spectrogram of the beat frequency signal and each of the plurality of theoretical 2D time frequency spectrograms may be implemented in the following two manners.

Manner 1: Size conversion is performed on the 2D time frequency spectrogram $T(l, k)$ of the beat frequency signal to obtain a 2D time frequency spectrogram $\hat{T}(l, k)$, $0 \leq l < N_t$, $0 \leq k < N_f$ of the beat frequency signal whose size is $N_t \times N_f$, where l is a time sequence number, $N_t$ is a quantity of time sequence numbers, k is a frequency sequence number, and $N_f$ is a length of the frequency sequence number.

Then a matching degree $M_{rf}(\tau, f_d)$ between each theoretical 2D time frequency spectrogram $M_{f_d,\tau}(l, k)$ and the size-converted 2D time frequency spectrogram $\hat{T}(l, k)$ of the beat frequency signal is calculated by using the following formula:

$$M_{rf}(\tau,f_d)=\Sigma_{k=0}^{N_f-1}\Sigma_{l=0}^{N_t-1}\hat{T}(l,k)\cdot M_{f_d,\tau}(l,k),$$

where the matching degree is a similarity degree between the 2D time frequency spectrogram $M_{f_d,\tau}(l, k)$ and the size converted 2D time frequency spectrogram $\hat{T}(l, k)$ of the beat frequency signal, and the matching degree $M_{rf}(\tau, f_d)$ in the foregoing formula is a value obtained by multiplying amplitudes, corresponding to each time sequence number, of the 2D time frequency spectrogram $M_{f_d,\tau}(l, k)$ and the size-converted 2D time frequency spectrogram $\hat{T}(l, k)$ of the beat frequency signal, and then adding up obtained products.

Finally, the calculated matching degree $M_{rf}(\tau, f_d)$ is determined as the matching degree between the 2D time frequency spectrogram of the beat frequency signal and each of the plurality of theoretical 2D time frequency spectrograms.

Manner 2: First, a frequency $f_{best}(l \cdot \Delta t, \tau, f_d)$ of each sequence corresponding to each beat frequency curve $f_{best}(t, \tau, f_d)$ is calculated, where $\Delta t$ is duration of each sequence.

Then the frequency $f_{best}(l \cdot \Delta t, \tau, f_d)$ of each sequence is converted into an integer multiple of a frequency resolution $\Delta f$ of the 2D time frequency spectrogram $T(l, k)$ of the beat frequency signal by using the following formula to obtain $k_{l,\tau,fd}$:

$$k_{l,\tau,fd}=\text{round}(f_{best}(l\cdot\Delta t,\tau,fd)/\Delta f),$$

where $\Delta f = 1/\Delta t$, and round( ) indicates rounding.

Then a matching degree $Q_{rf}(\tau, f_d)$ between $k_{l,\tau,fd}$ and $f_d$, $\tau$ corresponding to each beat frequency curve $f_{best}(t, \tau, f_d)$ is calculated by using the following formula:

$$Q_{rf}(\tau,f_d)=\Sigma_{l=0}^{N}T(l,k_{l,\tau,fd}),$$

where in the foregoing formula, $T(l, k_{l,\tau,fd})$ is a 2D time frequency spectrogram whose time sequence number is l and whose frequency sequence number is $k_{l,\tau,fd}$, and the matching degree $Q_{rf}(\tau, f_d)$ is a value obtained by adding up N $T(l, k_{l,\tau,fd})$.

Finally, the calculated matching degree $Q(\tau, f_d)$ is determined as the matching degree between the 2D time frequency spectrogram of the beat frequency signal and each of the plurality of theoretical 2D time frequency spectrograms.

S1022: Determine, as the target 2D time frequency spectrogram, a theoretical 2D time frequency spectrogram whose matching degree is greater than or equal to the preset threshold.

Specifically, after the matching degree between the 2D time frequency spectrogram of the beat frequency signal and each of the plurality of theoretical 2D time frequency spectrograms is calculated, a theoretical 2D time frequency spectrogram whose matching degree is greater than or equal to the preset threshold may be determined as the target 2D time frequency spectrogram. For example, the preset threshold is 90%, and a theoretical 2D time frequency spectrogram whose matching degree is greater than or equal to 90% is the target 2D time frequency spectrogram. In this case, there may be a plurality of target 2D time frequency spectrograms. Alternatively, a theoretical 2D time frequency spectrogram with a highest matching degree among the plurality of theoretical 2D time frequency spectrograms may be determined as the target 2D time frequency spectrogram. In this case, there is one target 2D time frequency spectrogram.

S103: Obtain a distance and a speed of the target object based on a flight time and a Doppler frequency offset that correspond to the target 2D time frequency spectrogram.

Specifically, the distance of the target object may be obtained based on a corresponding calculation formula and the flight time corresponding to the target 2D time frequency spectrogram, and the speed of the target object may be obtained based on a corresponding calculation formula and the Doppler frequency offset corresponding to the target 2D time frequency spectrogram.

According to the beat frequency signal processing method provided in this embodiment, first, the 2D time frequency spectrogram of the beat frequency signal is determined based on the time domain signal of the beat frequency signal. Then matching is performed between the 2D time frequency spectrogram of the beat frequency signal and the plurality of theoretical 2D time frequency spectrograms, and the theoretical 2D time frequency spectrogram whose matching degree is greater than or equal to the preset threshold among the plurality of theoretical 2D time frequency spectrograms is determined as the target 2D time frequency spectrogram, where the plurality of theoretical 2D time frequency spectrograms are 2D time frequency spectrograms of the beat frequency signal, under the combinations of the plurality of flight times and the plurality of Doppler frequency offsets, that are calculated based on the frequency sweep curve of the frequency modulated signal. Finally, the distance of the target object is obtained based on the flight time corresponding to the target 2D time frequency spectrogram, and the speed of the target object is obtained based on the Doppler frequency offset corresponding to the target 2D time frequency spectrogram. In this embodiment, because the target 2D time frequency spectrogram is obtained from the plurality of theoretical 2D time frequency spectrograms through matching based on the 2D time frequency spectrogram of the beat frequency signal, the target 2D time frequency spectrogram carries the corresponding flight time and Doppler frequency offset. Therefore, the distance and the speed of the target object may be obtained based on the flight time and the Doppler frequency offset that correspond to the target 2D time frequency spectrogram. According to the method in this embodiment, the distance and the speed of the target object can be accurately obtained based on the time domain signal of the beat frequency signal, regardless of whether the frequency modulated signal is nonlinear and without being affected by external factors such as temperature and vibration. In this way, the speed and the distance of the target object are accurately estimated when the frequency modulated signal is nonlinear, and accuracy of estimating the speed and the distance of the target object is improved.

The following describes in detail the technical solution of the method embodiment shown in FIG. 3 by using several specific embodiments.

Figure 4:
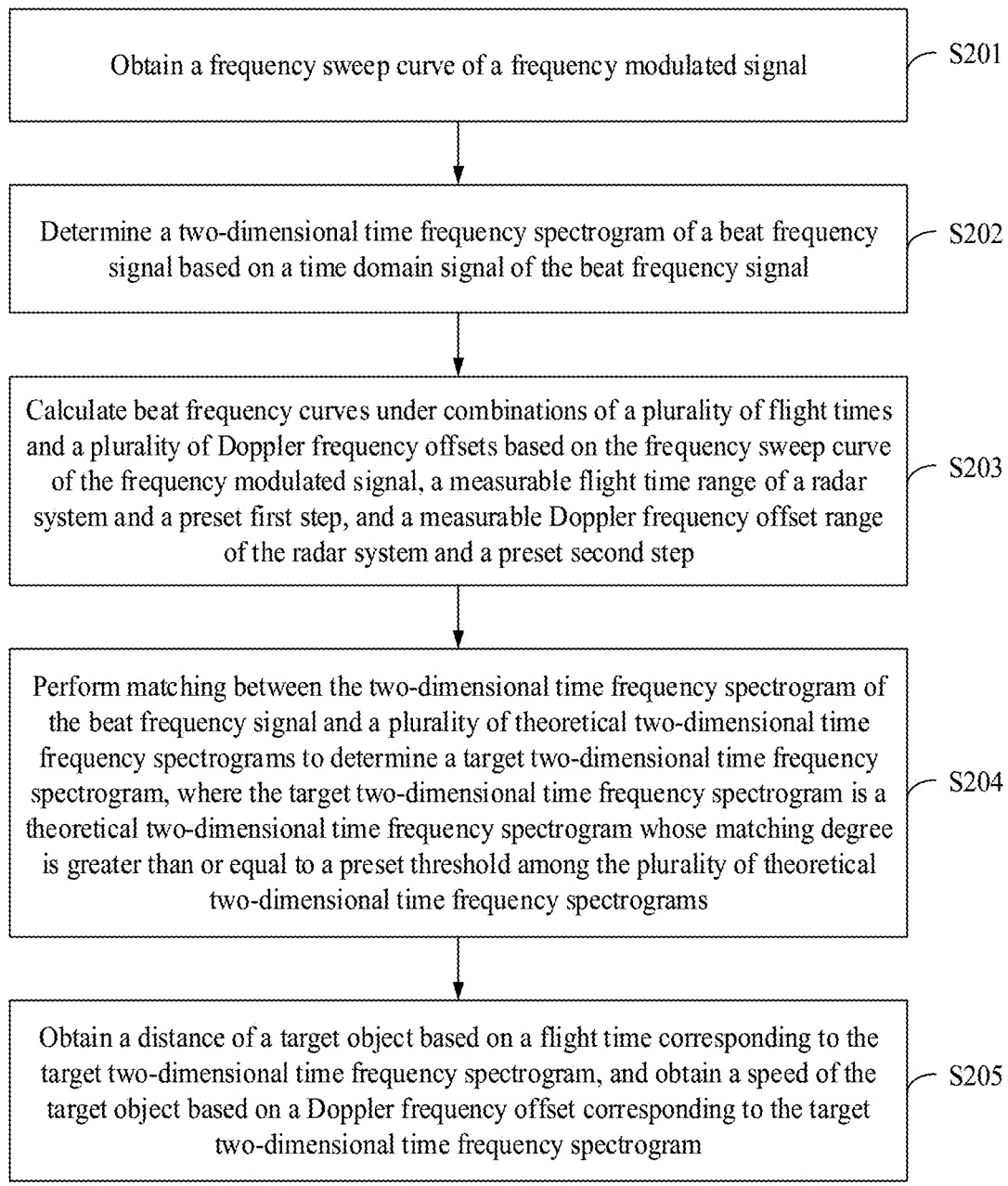
FIG. 4 is a flowchart of an embodiment of a beat frequency signal processing method according to an embodiment of the present disclosure.

FIG. 4 is a flowchart of an embodiment of a beat frequency signal processing method according to the present disclosure. As shown in FIG. 4, the method in this embodiment may include the following steps.

S201: Obtain a frequency sweep curve of a frequency modulated signal.

The frequency sweep curve $f_{est}(t)$ of the frequency modulated signal may be prestored. Specifically, before a frequency modulated signal generation module in a radar system is delivered out of a factory, the frequency sweep curve of the frequency modulated signal output by the frequency modulated signal generation module is detected by a test apparatus, for example, a spectrogram analyzer, and then stored.

Alternatively, the frequency sweep curve $f_{est}(t)$ of the frequency modulated signal may be measured in real time. The real-time measurement may be performing measurement by using a reference circuit. A specific method is as follows: Energy of the frequency modulated signal is split into two parts, and each part of signal is introduced into two optical fibers with different delays to obtain two laser signals with different delays. Then a frequency mixer performs frequency mixing on the two laser signals with different delays to obtain a beat frequency signal, and an ADC performs sampling to obtain a time domain signal of the beat frequency signal, where a delay difference $\tau_{ref}$ between the two optical fibers is known. Then phase estimation is performed on the time domain signal of the beat frequency signal to obtain a phase sequence $\varphi_{ref}(n)$ of the beat frequency signal. Finally, the frequency sweep curve $f_{est}(n)$ of the frequency modulated signal is calculated by using the following formula: $f_{est}(n)=\varphi_{ref}(n)/2\pi\tau_{ref}$. When real-time measurement is performed by using this method, measurement may be performed with changes of conditions such as temperature and humidity, and accuracy is higher.

S202: Determine a 2D time frequency spectrogram of a beat frequency signal based on a time domain signal of the beat frequency signal.

Figure 5:
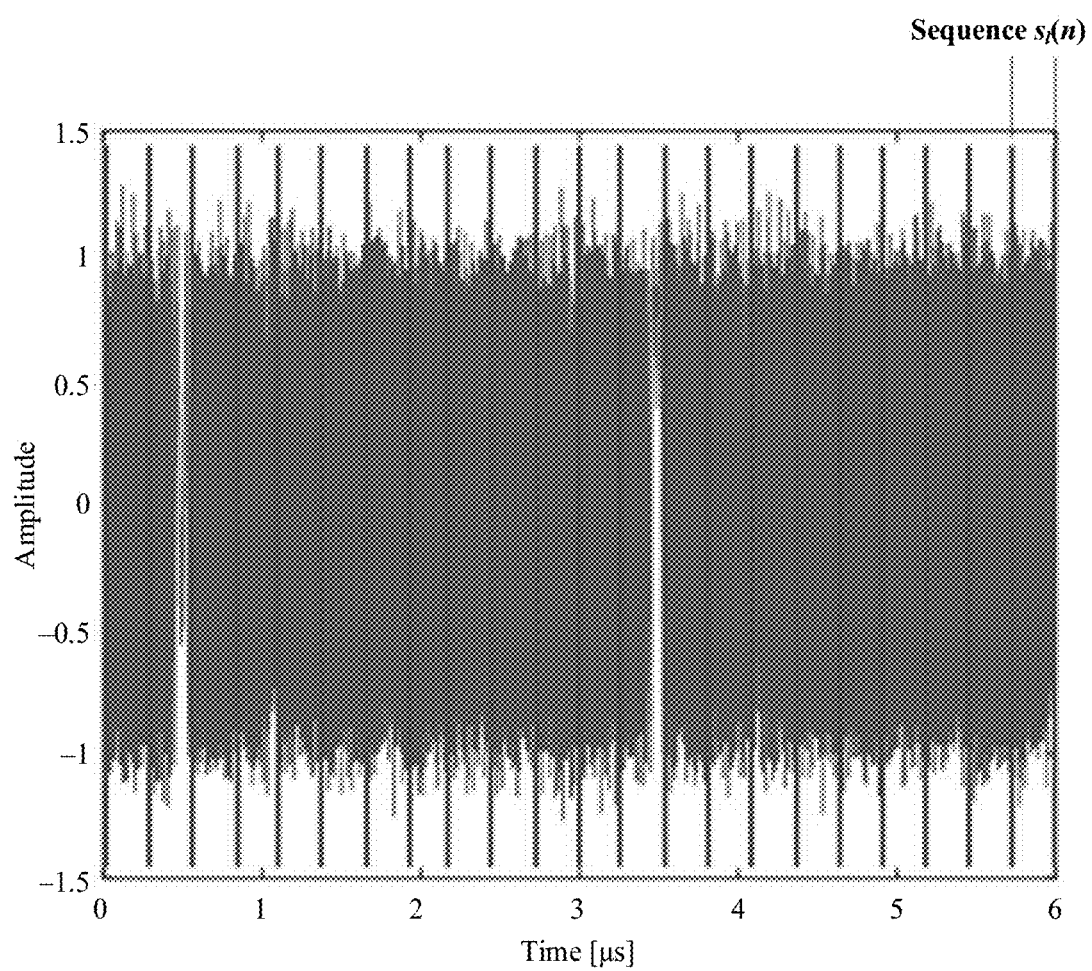
FIG. 5 is a schematic diagram of a segmented sampled sequence of a beat frequency signal according to an embodiment of the present disclosure.

Specifically, first, a sampled sequence of the beat frequency signal is segmented to obtain N sequences $s_l(n)$, where the sequence is $s_l(n)=s[(l-1)\cdot M+n]$, $0\le n<M$, $0\le l<N$, M is a quantity of sampling points of one sequence $s_l(n)$, and M is a positive integer. For example, if the sampled sequence of the beat frequency signal includes a total of 20000 sampling points and N is 100, M is 200. FIG. 5 is a schematic diagram of a segmented sampled sequence of the beat frequency signal. As shown in FIG. 5, a horizontal coordinate in FIG. 5 indicates a time, and a vertical coordinate indicates an amplitude of the sampled sequence of the beat frequency signal. FIG. 5 shows 22 sequences $s_l(n)$ obtained through segmentation.

Figure 6:
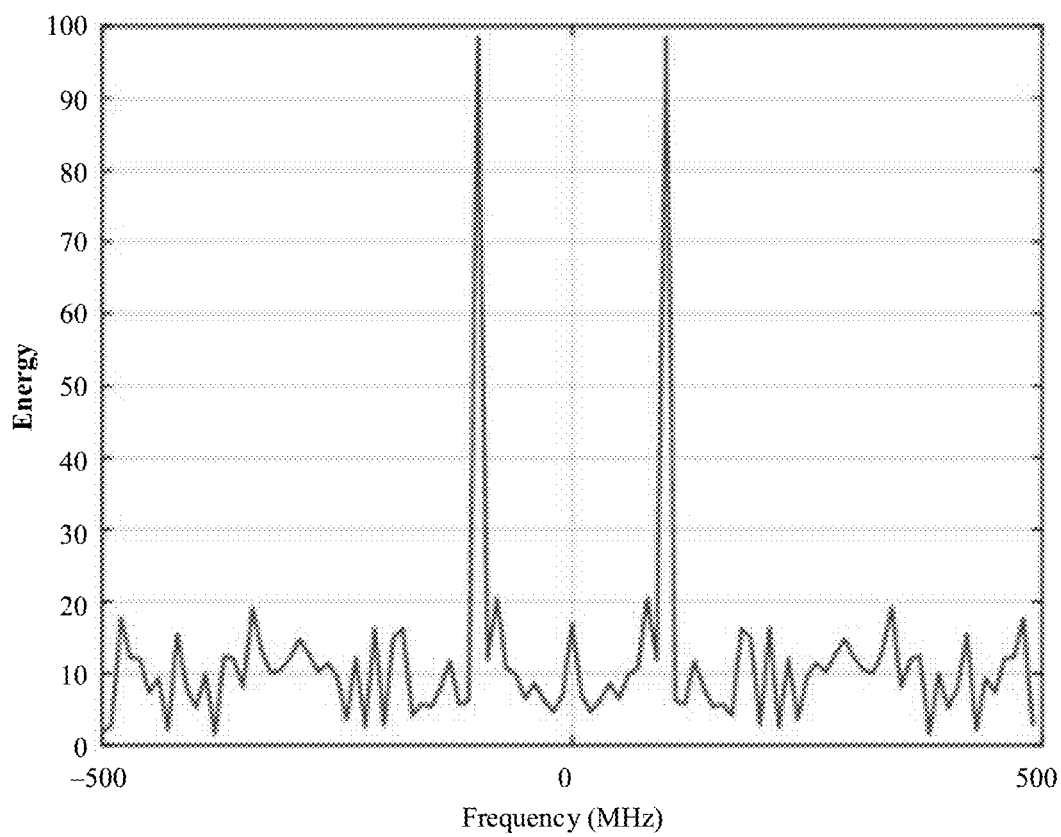
FIG. 6 is a schematic diagram of a frequency spectrogram obtained by performing FFT on a sequence according to an embodiment of the present disclosure.

Then, using an example in which FFT is performed on each sequence $s_l(n)$ of the N sequences, FFT is performed on each sequence $s_l(n)$ of the N sequences to obtain N frequency spectrograms $S_l(k)$, where $S_l(k)=F[s_l(n)]$, $0\le k<M$, and F[ ] indicates an FFT operation. FIG. 6 is a schematic diagram of a frequency spectrogram obtained by performing FFT on a sequence $s_l(n)$. As shown in FIG. 6, a horizontal coordinate in FIG. 6 indicates a frequency, and a vertical coordinate indicates energy. FIG. 6 shows energy corresponding to each frequency, where two peaks indicate maximum energy values corresponding to two positive and negative frequency points, and the two positive and negative frequency points are symmetric.

Figure 7:
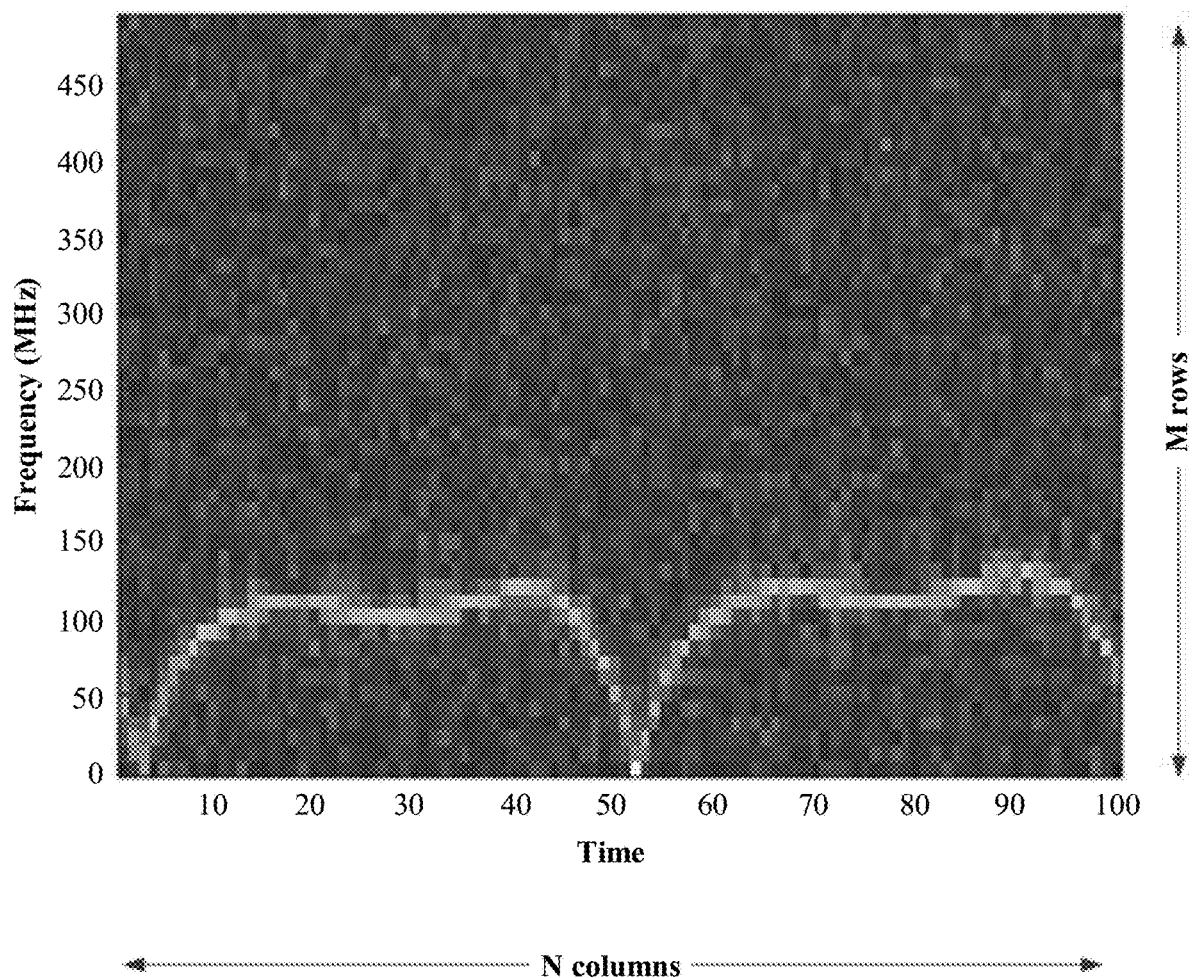
FIG. 7 is a schematic diagram of a 2D time frequency spectrogram of a beat frequency signal according to an embodiment of the present disclosure.

Finally, the N frequency spectrograms $S_l(k)$ are stored in a time sequence corresponding to the N sequences to obtain the 2D time frequency spectrogram T(l, k) of the beat frequency signal, where l is a time sequence number, and k is a frequency sequence number. FIG. 7 is a schematic diagram of a 2D time frequency spectrogram of a beat frequency signal. As shown in FIG. 7, a horizontal coordinate in FIG. 7 indicates a time, and a vertical coordinate indicates a frequency. FIG. 7 shows a relationship between a frequency and a time of the beat frequency signal, namely, the 2D time frequency spectrogram of the beat frequency signal.

S203: Calculate beat frequency curves under combinations of a plurality of flight times and a plurality of Doppler frequency offsets based on the frequency sweep curve of the frequency modulated signal, a measurable flight time range of the radar system and a preset first step, and a measurable Doppler frequency offset range of the radar system and a preset second step.

Specifically, S203 may be as follows:

S2031: Determine the combinations of the plurality of different flight times and the plurality of Doppler frequency offsets based on the measurable flight time range of the radar system and the preset first step and based on the measurable Doppler frequency offset range of the radar system and the preset second step.

S2032: Calculate the beat frequency curves $f_{best}(t, \tau, f_d)$ under the combinations of the plurality of flight times and the plurality of Doppler frequency offsets based on the frequency sweep curve $f_{est}(t)$ of the frequency modulated signal by using the following formula:

$$f_{best}(t,\tau,f_d) = f_{est}(t) - [f_{est}(t-\tau) + f_d],$$

where $\tau$ is the flight time, and $f_d$ is the Doppler frequency offset.

S2033: Convert each beat frequency curve $f_{best}(t, \tau, f_d)$ into a 2D time frequency spectrogram $M_{f_d,\tau}(l, k)$ whose size is $N_t \times N_f$ to obtain the plurality of theoretical 2D time frequency spectrograms $M_{f_d,\tau}(l, k)$, where $0 \leq l < N_t$, $0 \leq k < N_f$, l is a time sequence number, $N_t$ is a quantity of time sequence numbers, k is a frequency sequence number, and $N_f$ is a length of the frequency sequence number.

Figure 8:
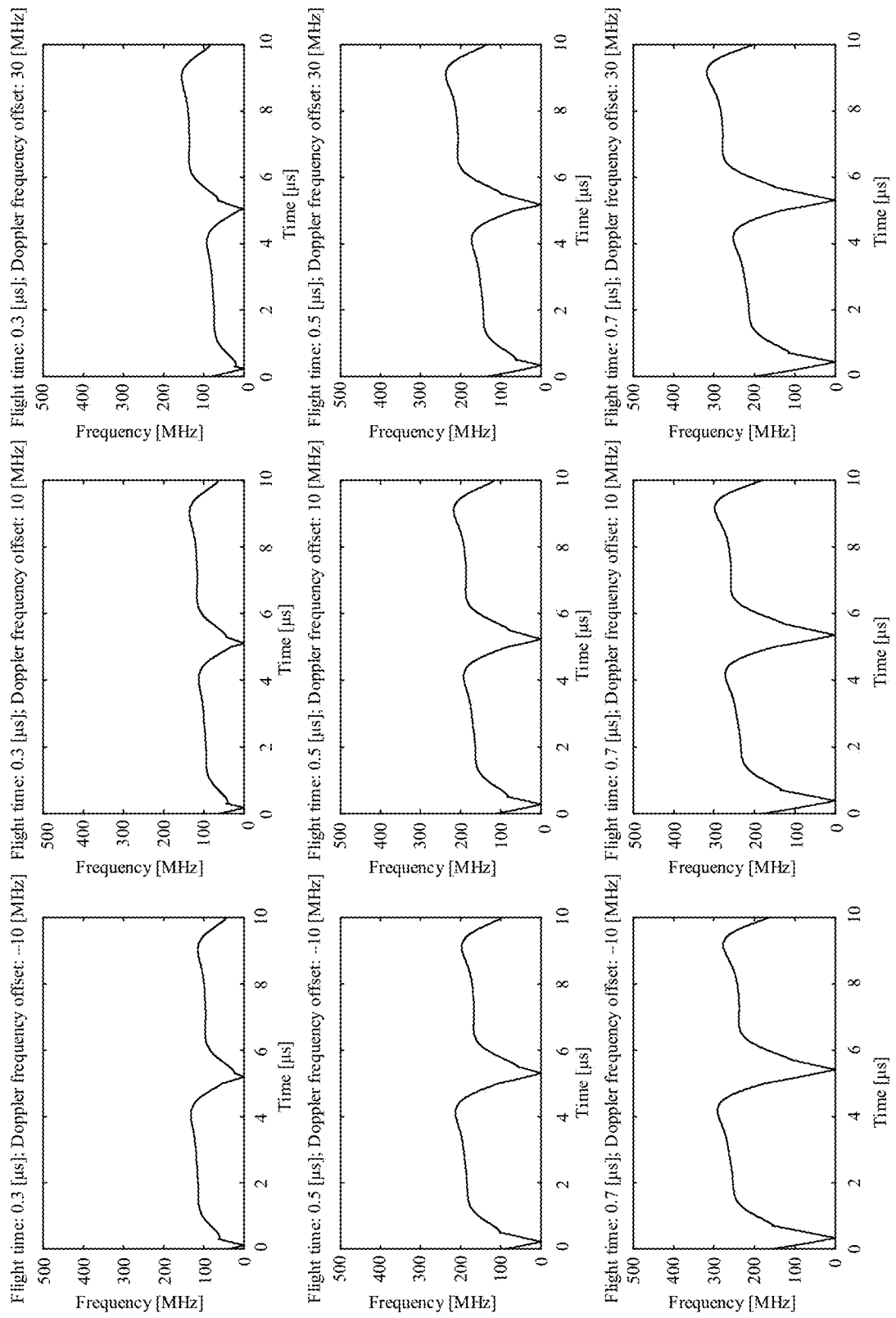
FIG. 8 is a schematic diagram of theoretical 2D time frequency spectrograms obtained under combinations of a plurality of flight times and a plurality of Doppler frequency offsets according to an embodiment of the present disclosure.

FIG. 8 is a schematic diagram of theoretical 2D time frequency spectrograms obtained under combinations of a plurality of flight times and a plurality of Doppler frequency offsets. FIG. 8 shows nine theoretical 2D time frequency spectrograms.

For detailed processes of S2031 to S2033, refer to the descriptions of S1041 to S1043 in FIG. 3. Details are not described herein again.

It should be noted that the plurality of theoretical 2D time frequency spectrograms $M_{f_d,\tau}(l, k)$ may be calculated by using S2031 to S2033 and then stored, or may be prestored, or may be stored after first calculation.

S204: Perform matching between the 2D time frequency spectrogram of the beat frequency signal and the plurality of theoretical 2D time frequency spectrograms to determine a target 2D time frequency spectrogram, where the target 2D time frequency spectrogram is a theoretical 2D time frequency spectrogram whose matching degree is greater than or equal to a preset threshold among the plurality of theoretical 2D time frequency spectrograms.

S205: Obtain a distance of a target object based on a flight time corresponding to the target 2D time frequency spectrogram, and obtain a speed of the target object based on a Doppler frequency offset corresponding to the target 2D time frequency spectrogram.

Specifically, matching is performed between the 2D time frequency spectrogram of the beat frequency signal that is obtained in S202 (e.g., the 2D time frequency spectrogram of the beat frequency signal shown in FIG. 7) and the plurality of theoretical 2D time frequency spectrograms (e.g., the nine theoretical 2D time frequency spectrograms shown in FIG. 8), to determine the target 2D time frequency spectrogram. First, a matching degree between the 2D time frequency spectrogram of the beat frequency signal and each of the plurality of theoretical 2D time frequency spectrograms is determined. Then a theoretical 2D time frequency spectrogram whose matching degree is greater than or equal to the preset threshold or with a highest matching degree is determined as the target 2D time frequency spectrogram. The nine theoretical 2D time frequency spectrograms shown in FIG. 8 are used as an example. For example, the determined target 2D time frequency spectrogram is a 2D time frequency spectrogram shown in a diagram in the $1^{st}$ row and the $2^{nd}$ column in FIG. 8 (the 2D time frequency spectrogram is a theoretical 2D time frequency spectrogram with a highest matching degree), a flight time corresponding to the 2D time frequency spectrogram is 0.3 μs, and a Doppler frequency offset corresponding to the 2D time frequency spectrogram is 10 MHz. In this case, the distance and the speed of the target object are 0.5 μs and 10 MHz respectively. Based on corresponding calculation formulas, 0.5 μs and 10 MHz are converted into values corresponding to a corresponding distance unit and a corresponding speed unit respectively.

The determining a matching degree between the 2D time frequency spectrogram of the beat frequency signal and each of the plurality of theoretical 2D time frequency spectrograms may be implemented in two manners. For details, refer to the detailed descriptions in the embodiment shown in FIG. 3. Details are not described herein again.

According to the beat frequency signal processing method provided in this embodiment, the time domain signal of the received beat frequency signal is split into the N sequences to perform time frequency transform processing, to obtain the 2D time frequency spectrogram of the beat frequency signal. Nonlinearity of the frequency modulated signal causes energy of the beat frequency signal to diffuse to a range, and further causes a frequency of the beat frequency signal to drift with time. Although the received beat frequency signal has nonlinearity, after the time domain signal of the beat frequency signal is split into the N sequences, duration of each sequence is short, and impact caused by nonlinearity of the beat frequency signal is greatly reduced. Therefore, the time frequency transform is performed on each sequence to obtain the N frequency spectrograms, and then the N frequency spectrograms are stored in the time sequence corresponding to the N sequences to obtain the 2D time frequency spectrogram of the beat frequency signal. In this way, the energy of the beat frequency signal can be concentrated in some time frequency cells, and diffusion of the energy of the beat frequency signal can be reduced, thereby improving accuracy of estimating the speed and the distance of the target object. Further, in this embodiment, because the target 2D time frequency spectrogram is obtained from the plurality of theoretical 2D time frequency spectrograms through matching based on the 2D time frequency spectrogram of the beat frequency signal, the target 2D time frequency spectrogram carries the corresponding flight time and Doppler frequency offset. Therefore, the distance and the speed of the target object may be obtained based on the flight time and the Doppler frequency offset that correspond to the target 2D time frequency spectrogram. According to the method in this embodiment, the distance and the speed of the target object can be accurately obtained based on the time domain signal of the beat frequency signal, regardless of whether the frequency modulated signal is nonlinear and without being affected by external factors such as temperature and vibration. In this way, the speed and the distance of the target object are accurately estimated when the frequency modulated signal is nonlinear, and accuracy of estimating the speed and the distance of the target object is improved.

Figure 9:
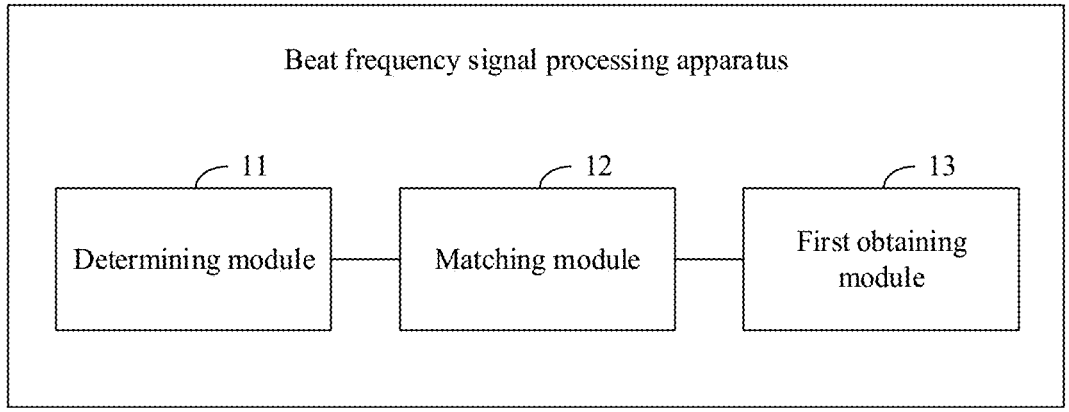
FIG. 9 is a schematic diagram of a structure of an embodiment of a beat frequency signal processing apparatus according to an embodiment of the present disclosure.

FIG. 9 is a schematic diagram of a structure of an embodiment of a beat frequency signal processing apparatus according to the present disclosure. As shown in FIG. 9, the apparatus in this embodiment may include a determining module 11, a matching module 12, and a first obtaining module 13. The determining module 11 is configured to determine a 2D time frequency spectrogram of a beat frequency signal based on a time domain signal of the beat frequency signal, where the beat frequency signal is a signal obtained by performing frequency mixing on a local-frequency signal and an echo signal, the local-frequency signal is one signal of a frequency modulated signal, the echo signal is a signal formed by reflecting another signal that is of the frequency modulated signal and that is transmitted to a target object, the frequency modulated signal is a signal that is generated by a radar system and whose frequency is modulated, and the 2D time frequency spectrogram indicates a relationship between a frequency and a time of the beat frequency signal.

The matching module 12 is configured to perform matching between the 2D time frequency spectrogram of the beat frequency signal and a plurality of theoretical 2D time frequency spectrograms to determine a target 2D time frequency spectrogram, where the target 2D time frequency spectrogram is a theoretical 2D time frequency spectrogram whose matching degree is greater than or equal to a preset threshold among the plurality of theoretical 2D time frequency spectrograms, and the plurality of theoretical 2D time frequency spectrograms are 2D time frequency spectrograms of the beat frequency signal, under combinations of a plurality of flight times and a plurality of Doppler frequency offsets, that are calculated based on a frequency sweep curve of the frequency modulated signal.

The first obtaining module 13 is configured to obtain a distance and a speed of the target object based on a flight time and a Doppler frequency offset that correspond to the target 2D time frequency spectrogram.

The apparatus in this embodiment may be used to execute the technical solutions of the method embodiment shown in FIG. 3. The implementation principles and technical effects are similar, and are not further described herein.

Figure 10:
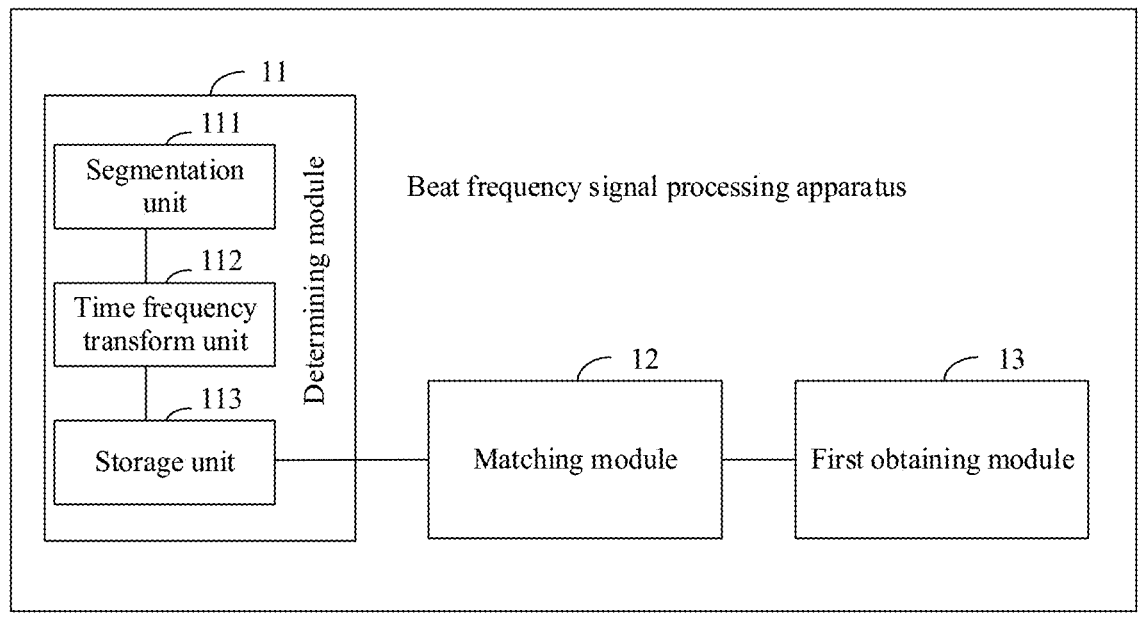
FIG. 10 is a schematic diagram of a structure of an embodiment of a beat frequency signal processing apparatus according to an embodiment of the present disclosure.

FIG. 10 is a schematic diagram of a structure of an embodiment of a beat frequency signal processing apparatus according to the present disclosure. As shown in FIG. 10, based on the apparatus shown in FIG. 9, in the apparatus in this embodiment, the determining module 11 further includes a segmentation unit 111, a time frequency transform unit 112, and a storage unit 113. The segmentation unit 111 is configured to segment the time domain signal of the beat frequency signal to obtain N sequences, where N is a preset positive integer, and each sequence includes a plurality of sampling points.

The time frequency transform unit 112 is configured to perform time frequency transform on each of the N sequences to obtain N frequency spectrograms.

The storage unit 113 is configured to store the N frequency spectrograms in a time sequence corresponding to the N sequences to obtain the 2D time frequency spectrogram of the beat frequency signal.

Further, the segmentation unit 111 is further configured to: segment the sampled sequence of the beat frequency signal to obtain N sequences $s_l(n)$, where the sequence is $s_l(n)=s[(l-1)\cdot M+n]$, $0 \le n < M$, $0 \le l < N$, M is a quantity of sampling points of one sequence $s_l(n)$, and M is a positive integer.

Further, the time frequency transform unit 112 is further configured to perform FFT on each sequence $s_l(n)$ of the N sequences to obtain N frequency spectrograms $S_l(k)$, where $S_l(k)=F[s_l(n)]$, $0 \le k < M$, and F[ ] indicates an FFT operation; and the storage unit 113 is further configured to store the N frequency spectrograms $S_l(k)$ in the time sequence corresponding to the N sequences to obtain the 2D time frequency spectrogram T(l, k) of the beat frequency signal, where l is a time sequence number, and k is a frequency sequence number.

Optionally, N is set based on linearity corresponding to a time when the frequency modulated signal is generated.

The apparatus in this embodiment may be used to execute the technical solutions of the method embodiment shown in FIG. 3. The implementation principles and technical effects are similar, and are not further described herein.

Figure 11:
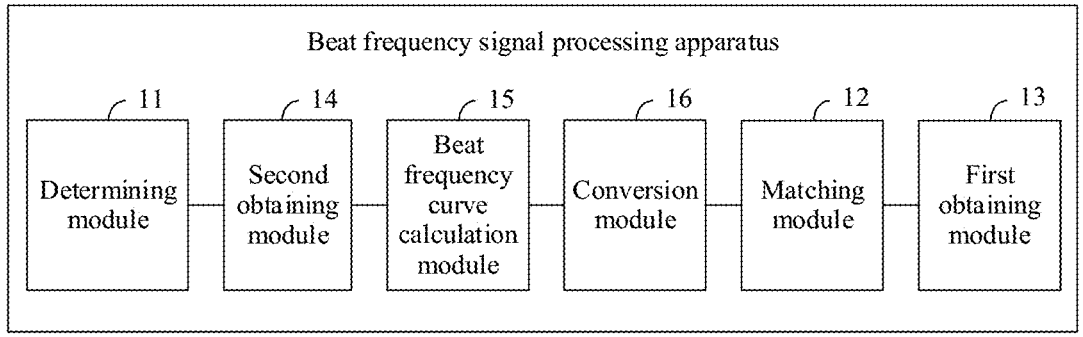
FIG. 11 is a schematic diagram of a structure of an embodiment of a beat frequency signal processing apparatus according to an embodiment of the present disclosure.

FIG. 11 is a schematic diagram of a structure of an embodiment of a beat frequency signal processing apparatus according to the present disclosure. As shown in FIG. 11, based on the apparatus shown in FIG. 9, the apparatus in this embodiment may further include a second obtaining module 14, a beat frequency curve calculation module 15, and a conversion module 16.

The second obtaining module 14 is configured to determine combinations of a plurality of different flight times and a plurality of Doppler frequency offsets based on a measurable flight time range of a radar system and a preset first step and based on a measurable Doppler frequency offset range of the radar system and a preset second step.

The beat frequency curve calculation module 15 is configured to calculate beat frequency curves $f_{best}(t, \tau, f_d)$ under the combinations of the plurality of flight times and the plurality of Doppler frequency offsets based on the frequency sweep curve $f_{est}(t)$ of the frequency modulated signal by using the following formula:

$$f_{best}(t,\tau,f_d)=f_{est}(t)-[f_{est}(t-\tau)+f_d],$$

where $\tau$ is the flight time, and $f_d$ is the Doppler frequency offset.

The conversion module 16 is configured to convert each beat frequency curve $f_{best}(t, \tau, f_d)$ into a 2D time frequency spectrogram $M_{f_d,\tau}(l, k)$ whose size is $N_t \times N_f$ to obtain the plurality of theoretical 2D time frequency spectrograms $M_{f_d,\tau}(l, k)$, where $0 \le l < N_t$, $0 \le k < N_f$, l is a time sequence number, $N_t$ is a quantity of time sequence numbers, k is a frequency sequence number, and $N_f$ is a length of the frequency sequence number.

The apparatus in this embodiment may be used to execute the technical solutions of the method embodiment shown in FIG. 3. The implementation principles and technical effects are similar, and are not further described herein.

Figure 12:
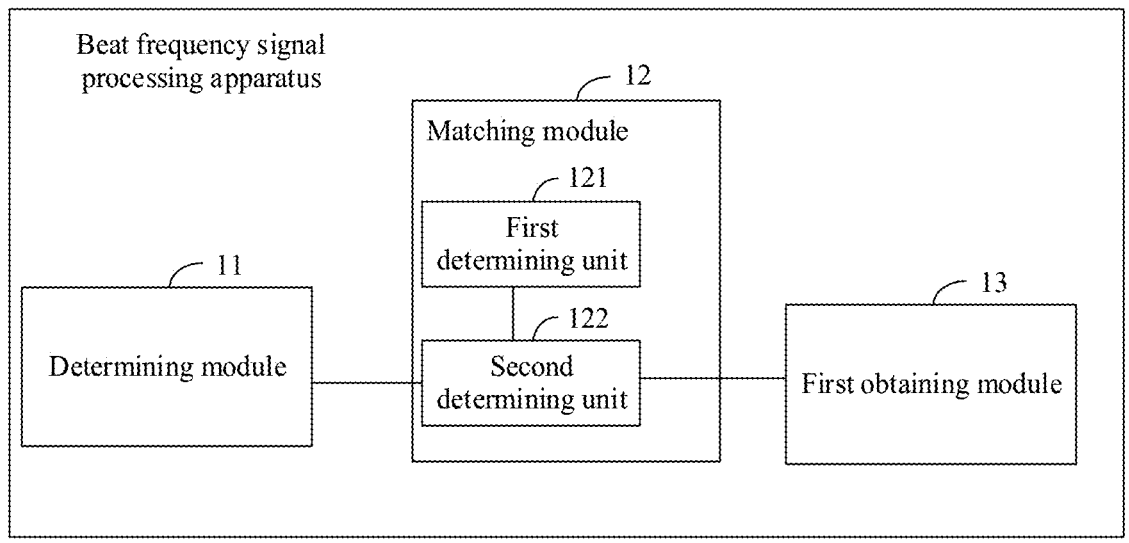
FIG. 12 is a schematic diagram of a structure of an embodiment of a beat frequency signal processing apparatus according to an embodiment of the present disclosure.

FIG. 12 is a schematic diagram of a structure of an embodiment of a beat frequency signal processing apparatus according to the present disclosure. As shown in FIG. 12, in the apparatus in this embodiment, based on any one of the apparatuses shown in FIG. 9 to FIG. 11, where FIG. 9 is used as an example in this embodiment, the matching module 12 further includes a first determining unit 121 and a second determining unit 122.

The first determining unit 121 is configured to determine a matching degree between the 2D time frequency spectrogram of the beat frequency signal and each of the plurality of theoretical 2D time frequency spectrograms.

The second determining unit 122 is configured to determine, as the target 2D time frequency spectrogram, a theoretical 2D time frequency spectrogram whose matching degree is greater than or equal to the preset threshold.

In an implementable manner, the first determining unit 121 is further configured to: perform size conversion on the 2D time frequency spectrogram T(l, k) of the beat frequency signal to obtain a 2D time frequency spectrogram $\hat{T}(l, k)$ of the beat frequency signal whose size is $N_t \times N_f$, where $0 \leq l < N_t$, $0 \leq k < N_f$, l is a time sequence number, $N_t$ is a quantity of time sequence numbers, k is a frequency sequence number, and $N_f$ is a length of the frequency sequence number; calculate, by using the following formula, a matching degree $M_{rf}(\tau, f_d)$ between each theoretical 2D time frequency spectrogram $M_{f_d,\tau}(l, k)$ and the size-converted 2D time frequency spectrogram $\hat{T}(l, k)$ of the beat frequency signal:

$$M_{rf}(\tau, f_d) = \Sigma_{k=0}^{N_f-1} \Sigma_{l=0}^{N_t-1} \hat{T}(l,k) \cdot M_{f_d,\tau}(l,k);$$

and determine the calculated matching degree $M_{rf}(\tau, f_d)$ as the matching degree between the 2D time frequency spectrogram of the beat frequency signal and each of the plurality of theoretical 2D time frequency spectrograms.

In an implementable manner, the first determining unit 121 is further configured to: calculate a frequency $f_{best}(l \cdot \Delta t, \tau, f_d)$ of each sequence corresponding to each beat frequency curve $f_{best}(t, \tau, f_d)$, where $\Delta t$ is duration of each sequence; convert the frequency $f_{best}(l \cdot \Delta t, \tau, f_d)$ of each sequence into an integer multiple of a frequency resolution $\Delta f$ of the 2D time frequency spectrogram T(l, k) of the beat frequency signal by using the following formula to obtain $k_{l,\tau,fd}$:

$$k_{l,\tau,fd} = \text{round}(f_{best}(l \cdot \Delta t, \tau, fd)/\Delta f),$$

where $\Delta f = 1/\Delta t$, and round( ) indicates rounding; calculate a matching degree $Q_{rf}(\tau, f_d)$ between $k_{l,\tau,fd}$ and $f_d$, $\tau$ corresponding to each beat frequency curve $f_{best}(t, \tau, f_d)$ by using the following formula:

$$Q_{rf}(\tau, f_d) = \Sigma_{l=0}^{Nslot} T(l, k_{l,\tau,fd});$$

and determine the calculated matching degree $Q(\tau, f_d)$ as the matching degree between the 2D time frequency spectrogram of the beat frequency signal and each of the plurality of theoretical 2D time frequency spectrograms.

The apparatus in this embodiment may be used to execute the technical solutions of the method embodiment shown in FIG. 3. The implementation principles and technical effects are similar, and are not further described herein.

Figure 13:
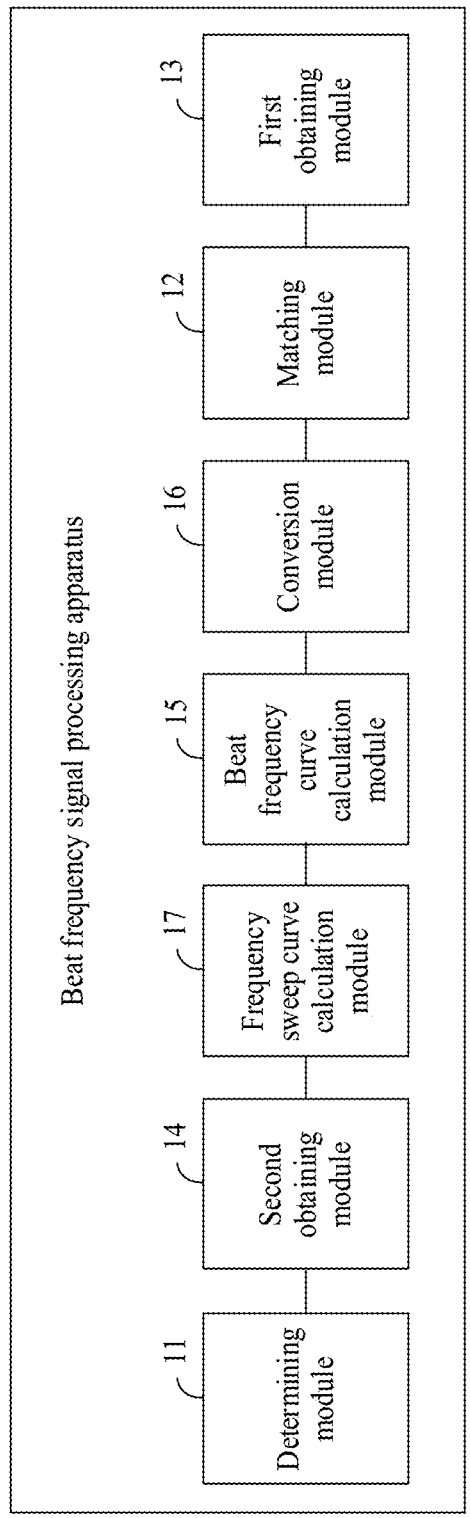
FIG. 13 is a schematic diagram of a structure of an embodiment of a beat frequency signal processing apparatus according to an embodiment of the present disclosure.

FIG. 13 is a schematic diagram of a structure of an embodiment of a beat frequency signal processing apparatus according to the present disclosure. As shown in FIG. 13, based on the apparatus shown in FIG. 11, the apparatus in this embodiment may further include a frequency sweep curve calculation module 17. The frequency sweep curve calculation module 17 is configured to: perform phase estimation on the time domain signal of the beat frequency signal to obtain a phase sequence $\varphi_{ref}(n)$ of the beat frequency signal; and calculate the frequency sweep curve $f_{est}(n)$ of the frequency modulated signal based on the phase sequence $\varphi_{ref}(n)$ of the beat frequency signal by using the following formula:

$$f_{est}(n) = \varphi_{ref}(n)/2\pi\tau_{ref},$$

where $\tau_{ref}$ is a delay difference between two optical fibers in the radar system.

The apparatus in this embodiment may be used to execute the technical solutions of the method embodiment shown in FIG. 3. The implementation principles and technical effects are similar, and are not further described herein.

Figure 14:
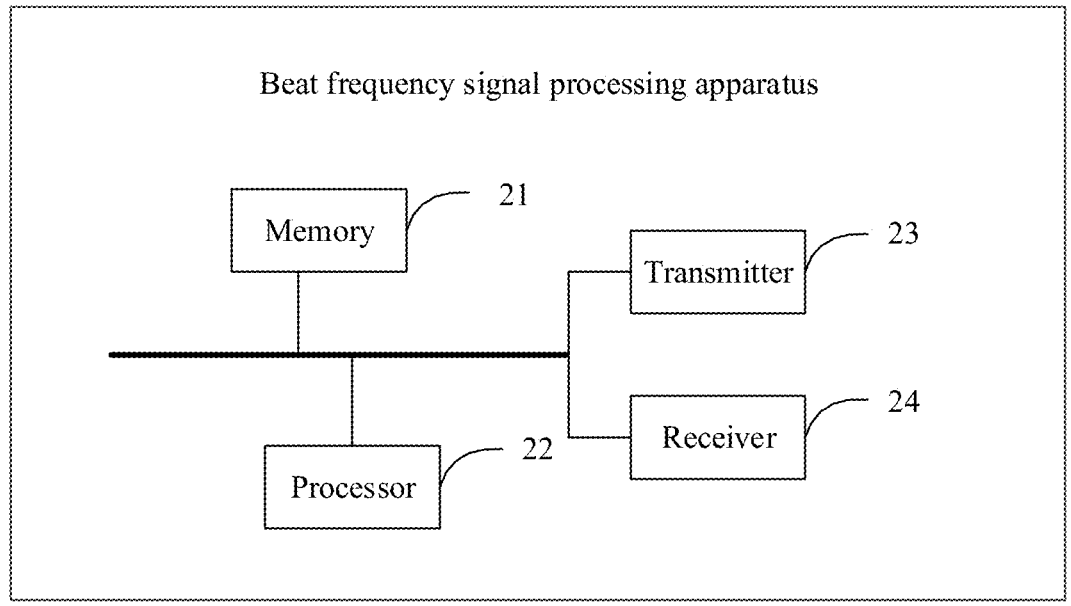
FIG. 14 is a schematic diagram of a structure of a beat frequency signal processing apparatus according to an embodiment of the present disclosure.

FIG. 14 is a schematic diagram of a structure of a beat frequency signal processing apparatus according to the present disclosure. The apparatus includes: a memory 21 configured to store program instructions, where the memory may be a flash; a processor 22 configured to invoke and execute the program instructions in the memory to implement the steps in the beat frequency signal processing method shown in FIG. 3, where for details, refer to related descriptions in the foregoing method embodiments; a transmitter 23 configured to transmit a detection signal to a target object; and a receiver 24 configured to receive an echo signal formed through reflection by the target object.

The apparatus may be configured to perform the steps and/or the procedures in the foregoing method embodiments.

The present disclosure further provides a readable storage medium. The readable storage medium stores executable instructions. When at least one processor of a beat frequency signal processing apparatus executes the executable instructions, the beat frequency signal processing apparatus performs the beat frequency signal processing method provided in the foregoing implementations.

The present disclosure further provides a chip. The chip includes a programmable logic circuit. When the chip is run, the programmable logic circuit is configured to implement the beat frequency signal processing method provided in the foregoing implementations.

Figure 15:
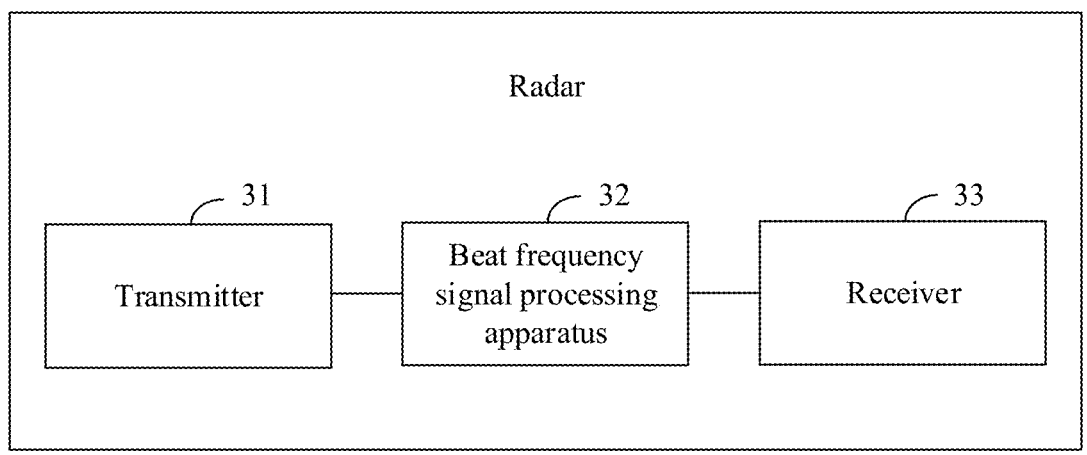
FIG. 15 is a schematic diagram of a structure of a radar according to an embodiment of the present disclosure.

FIG. 15 is a schematic diagram of a structure of a radar according to the present disclosure. As shown in FIG. 15, the radar in this embodiment includes a transmitter 31, a receiver 32, and a beat frequency signal processing apparatus 33.

The transmitter 31 is configured to transmit a detection signal to a target object. The receiver 32 is configured to receive an echo signal formed through reflection by the target object.

The beat frequency signal processing apparatus 33 is configured to perform the beat frequency signal processing method provided in the foregoing implementations.

Figure 16:
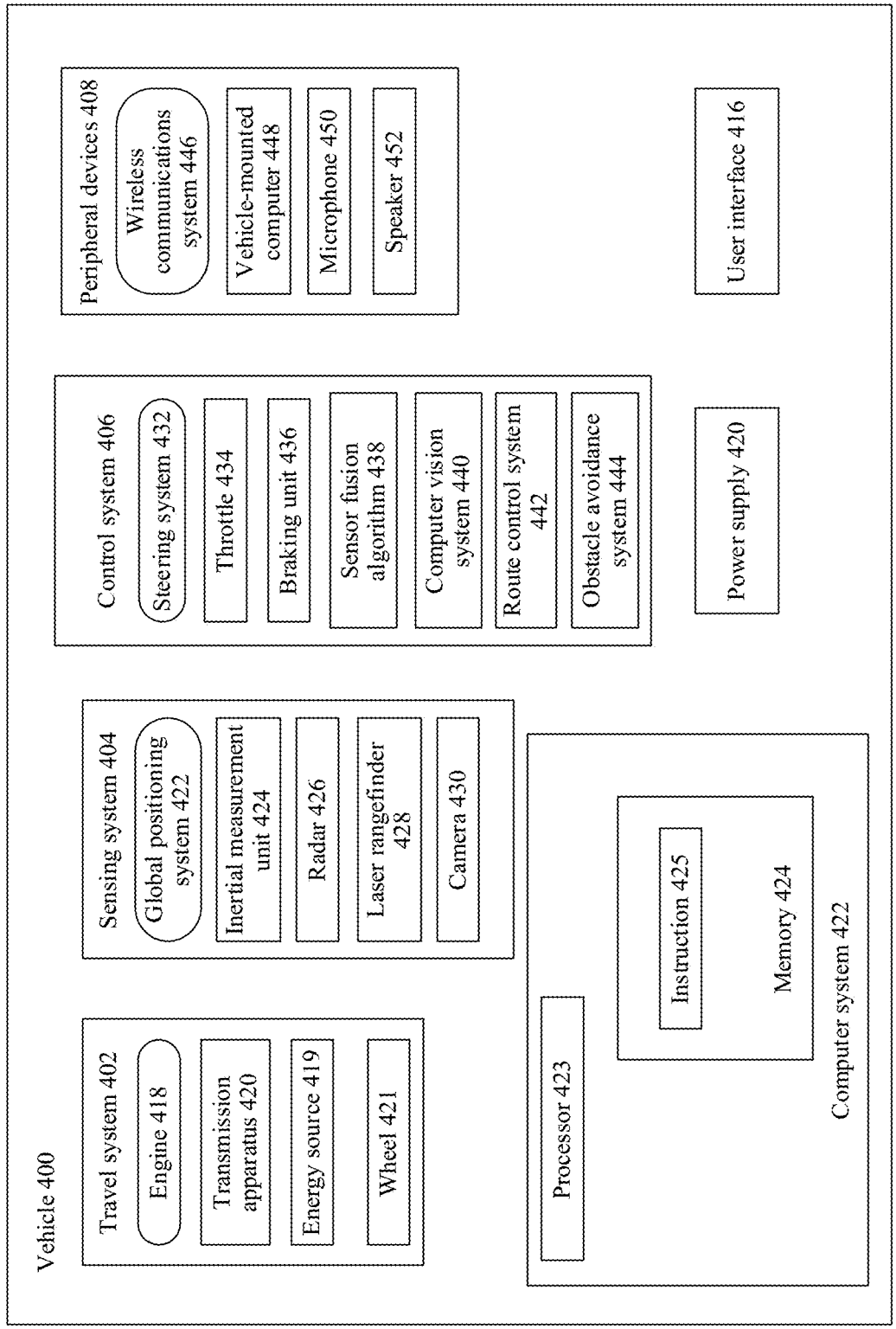
FIG. 16 is a functional block diagram of a vehicle with a self-driving function according to an embodiment of the present disclosure.

In a possible design, the radar provided in the present disclosure may be applied to a vehicle with a self-driving function. FIG. 16 is a functional block diagram of a vehicle 400 with a self-driving function according to the present disclosure. In an embodiment, the vehicle 400 is configured to be in a full or partial self-driving mode. For example, the vehicle 400 may control the vehicle 400 in the self-driving mode, determine a status of the vehicle and a surrounding environment of the vehicle through a manual operation, determine possible behavior of at least one another vehicle in the surrounding environment, determine a confidence level corresponding to a possibility of performing the possible behavior by the another vehicle, and control the vehicle 400 based on determined information. When the vehicle 400 is in the self-driving mode, the vehicle 400 may be configured to operate without interacting with a person.

The vehicle 400 may include various subsystems, for example, a travel system 402, a sensor system 404, a control system 406, one or more peripheral devices 408, a power supply 410, a computer system 412, and a user interface 416. Optionally, the vehicle 400 may include more or fewer subsystems, and each subsystem may include a plurality of elements. In addition, the subsystems and the elements of the vehicle 400 may be all interconnected in a wired or wireless manner.

The travel system 402 may include a component that provides power for motion of the vehicle 400. In an embodiment, the travel system 402 may include an engine 418, an energy source 419, a transmission apparatus 440, and a wheel/tire 421. The engine 418 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 418 converts the energy source 419 into mechanical energy.

Examples of the energy source 419 include gasoline, diesel, other petroleum-based fuels, propane, other compressed gas-based fuels, anhydrous alcohol, a photovoltaic module, a battery, and other power sources. The energy source 419 may also provide energy for another system of the vehicle 400.

The transmission apparatus 440 may transmit mechanical power from the engine 418 to the wheel 421. The transmission apparatus 440 may include a gearbox, a differential, and a drive shaft. In an embodiment, the transmission apparatus 440 may further include another device, for example, a clutch. The drive shaft may include one or more shafts that may be coupled to one or more wheels 421.

The sensor system 404 may include several sensors that sense information about a surrounding environment of the vehicle 400. For example, the sensor system 404 may include a positioning system 422 (the positioning system may be a Global Positioning System (GPS) system, a BeiDou system, or another positioning system), an inertial measurement unit (IMU) 424, a radar 426, a laser rangefinder 428, and a camera 430. The sensor system 404 may further include a sensor that monitors an internal system of the vehicle 400 (e.g., a vehicle-mounted air quality monitor, a fuel gauge, or an oil temperature gauge). Sensor data from one or more of these sensors may be used to detect an object and corresponding characteristics (e.g., a location, a shape, a direction, a speed, and the like) of the object. The detection and recognition are key functions for implementing a safe operation by the autonomous vehicle 400.

The positioning system 422 may be configured to estimate a geographical location of the vehicle 400. The IMU 424 is configured to sense a location and direction change of the vehicle 400 based on an inertial acceleration. In an embodiment, the IMU 424 may be a combination of an accelerometer and a gyroscope.

The radar 426 may use a radio signal to sense an object in a surrounding environment of the vehicle 400. In some embodiments, in addition to sensing an object, the radar 426 may be further configured to sense a speed, a distance, and/or an advancing direction of the object.

The laser rangefinder 428 may use laser light to sense an object in an environment in which the vehicle 400 is located. In some embodiments, the laser rangefinder 428 may include one or more laser sources, a laser scanner, one or more detectors, and another system component.

The camera 430 may be configured to capture a plurality of images of a surrounding environment of the vehicle 400. The camera 430 may be a still camera or a video camera.

The control system 406 controls operations of the vehicle 400 and components of the vehicle 400. The control system 406 may include various elements, including a steering system 432, a throttle 434, a braking unit 436, a sensor fusion algorithm 438, a computer vision system 440, a route control system 442, and an obstacle avoidance system 444.

The steering system 432 may operate to adjust an advancing direction of the vehicle 400. For example, in an embodiment, the steering system 432 may be a steering wheel system.

The throttle 434 is configured to control an operating speed of the engine 418, to control a speed of the vehicle 400.

The braking unit 436 is configured to control the vehicle 400 to decelerate. The braking unit 436 may slow down the wheel 421 through friction. In another embodiment, the braking unit 436 may convert kinetic energy of the wheel 421 into a current. Alternatively, the braking unit 436 may reduce a rotational speed of the wheel 421 in another form, to control the speed of the vehicle 400.

The computer vision system 440 may operate to process and analyze an image captured by the camera 430, to recognize objects and/or characteristics in the surrounding environment of the vehicle 400. The objects and/or the characteristics may include a traffic signal, a road boundary, and an obstacle. The computer vision system 440 may use an object recognition algorithm, a structure from motion (SFM) algorithm, video tracking, and other computer vision technologies. In some embodiments, the computer vision system 440 may be configured to draw a map for an environment, track an object, estimate a speed of an object, and the like.

The route control system 442 is configured to determine a driving route for the vehicle 400. In some embodiments, the route control system 442 may determine the driving route for the vehicle 400 with reference to data from the sensor fusion algorithm, 438, the GPS 422, and one or more predetermined maps.

The obstacle avoidance system 444 is configured to recognize, evaluate, and avoid or bypass, in another manner, a potential obstacle in the environment of the vehicle 400.

Certainly, in an example, the control system 406 may additionally or alternatively include components other than those shown and described. Alternatively, some of the components shown above may be omitted.

The vehicle 400 interacts with an external sensor, another vehicle, another computer system, or a user by using the peripheral device 408. The peripheral device 408 may include a wireless communications system 446, a vehicle-mounted computer 448, a microphone 450, and/or a speaker 452.

In some embodiments, the peripheral device 408 provides a means for a user of the vehicle 400 to interact with the user interface 416. For example, the vehicle-mounted computer 448 may provide information for the user of the vehicle 400. The user interface 416 may further operate the vehicle-mounted computer 448 to receive a user input. The vehicle-mounted computer 448 may be operated by using a touchscreen. In other cases, the peripheral device 408 may provide a means for the vehicle 400 to communicate with another device located in the vehicle. For example, the microphone 450 may receive audio (e.g., a voice command or another audio input) from the user of the vehicle 400. Likewise, the speaker 452 may output audio to the user of the vehicle 400.

The wireless communications system 446 may wirelessly communicate with one or more devices directly or by using a communications network. For example, the wireless communications system 446 may use 3G cellular communication such as code-division multiple access (CDMA), Evolution-Data Optimized (EVDO), or Global System for Mobile Communications (GSM)/general packet radio service (GPRS), 4G cellular communication such as Long-Term Evolution (LTE), or 5G cellular communication. The wireless communications system 446 may communicate with a wireless local area network (WLAN) by using Wi-Fi. In some embodiments, the wireless communications system 446 may directly communicate with a device by using an infrared link, Bluetooth, or ZigBee. Other wireless protocols, such as various vehicle communications systems, for example, the wireless communications system 446, may include one or more dedicated short range communications (DSRC) devices, and these devices may include public and/or private data communication between vehicles and/or roadside stations.

The power supply 410 may supply power to the components of the vehicle 400. In an embodiment, the power supply 410 may be a rechargeable lithium-ion or lead-acid battery. One or more battery packs of such a battery may be configured as a power supply to supply power to the components of the vehicle 400. In some embodiments, the power supply 410 and the energy source 419 may be implemented together. For example, the power supply 410 and the energy source 419 are implemented together in some all-electric vehicles.

Some or all functions of the vehicle 400 are controlled by the computer system 412. The computer system 412 may include at least one processor 413. The processor 413 executes instructions 415 stored in a non-transitory computer-readable medium such as the memory 414. The computer system 412 may be alternatively a plurality of computing devices that control individual components or subsystems of the vehicle 400 in a distributed manner.

The processor 413 may be any conventional processor such as a commercially available central processing unit (CPU). Alternatively, the processor may be a dedicated device such as an ASIC or another hardware-based processor. Although FIG. 16 functionally shows the processor, the memory, and other elements of the computer 410 in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer 410. Therefore, a reference to the processor or the computer is understood as including a reference to a set of processors, computers, or memories that may or may not operate in parallel. Different from using a single processor to perform the steps described herein, some components, such as a steering component and a deceleration component, each may have its own processor, and the processor performs only calculation related to a component-specific function.

In various aspects described herein, the processor may be located away from the vehicle and wirelessly communicate with the vehicle. In another aspect, some of the processes described herein are performed on a processor arranged in the vehicle, and others are performed by a remote processor, including performing a step to perform single manipulation.

In some embodiments, the memory 414 may include instructions 415 (e.g., program logic), and the instructions 415 may be executed by the processor 413 to perform various functions of the vehicle 400, including the functions described above. The memory 414 may also include additional instructions, including instructions to send data to, receive data from, interact with, and/or control one or more of the travel system 402, the sensor system 404, the control system 406, and the peripheral device 408.

In addition to the instructions 415, the memory 414 may further store data, for example, road map and route information; a location, a direction, a speed, and other vehicle data of a vehicle; and other information. The information may be used by the vehicle 400 and the computer system 412 when the vehicle 400 operates in an autonomous mode, a semi-autonomous mode, and/or a manual mode.

The user interface 416 is configured to provide information for or receive information from the user of the vehicle 400. Optionally, the user interface 416 may include one or more input/output devices in a set of peripheral devices 408, for example, the wireless communications system 446, the vehicle-mounted computer 448, the microphone 450, and the speaker 452.

The computer system 412 may control a function of the vehicle 400 based on inputs received from various subsystems (e.g., the travel system 402, the sensor system 404, and the control system 406) and the user interface 416. For example, the computer system 412 may control, by using an input from the control system 406, the steering unit 432 to avoid obstacles detected by the sensor system 404 and the obstacle avoidance system 444. In some embodiments, the computer system 412 is operable to provide control over many aspects of the vehicle 400 and the subsystems of the vehicle 400.

Optionally, one or more of the foregoing components may be mounted in separation from or associated with the vehicle 400. For example, the memory 414 may be partially or completely separated from the vehicle 400. The foregoing components may be communicatively coupled together in a wired and/or wireless manner.

Optionally, the foregoing components are merely examples. In actual application, components in the foregoing modules may be added or omitted according to an actual requirement. FIG. 16 should not be understood as a limitation on embodiments of the present disclosure.

A self-driving car traveling on a road, for example, the vehicle 400, may recognize an object in a surrounding environment of the car, to determine whether to adjust a current speed. The object may be another vehicle, a traffic control device, or another type of object. In some examples, each recognized object may be independently considered, and a speed to which the self-driving car needs to be adjusted may be determined based on a characteristic of the object, for example, a current speed or an acceleration of the object, or a distance between the object and the vehicle.

Optionally, the self-driving vehicle 400 or a computing device (e.g., the computer system 412, the computer vision system 440, or the memory 414 in FIG. 16) associated with the self-driving vehicle 400 may predict behavior of a recognized object based on a characteristic of the recognized object and a condition (e.g., traffic, rain, or ice on a road) of a surrounding environment. Optionally, all recognized objects depend on behavior of each other. Therefore, all the recognized objects may be alternatively jointly considered to predict behavior of a single recognized object. The vehicle 400 can adjust the speed of the vehicle 400 based on the predicted behavior of the recognized object. In other words, the self-driving car can determine, based on the predicted behavior of the object, a stable status to which the vehicle needs to be adjusted (e.g., an adjustment operation may include acceleration, deceleration, or stop). In this process, another factor may also be considered to determine the speed of the vehicle 400, for example, a lateral location of the vehicle 400 on a road on which the vehicle 400 travels, a curvature of the road, and proximity between a static object and a dynamic object.

In addition to providing an instruction for adjusting the speed of the self-driving car, the computing device may further provide an instruction for modifying a steering angle of the vehicle 400, so that the self-driving car follows a given track and/or maintains a safe lateral distance and a safe longitudinal distance from an object (e.g., a car in an adjacent lane of the road) near the self-driving car.

The vehicle 400 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in embodiments of the present disclosure.

A person of skill in the art may understand that all or some of the foregoing embodiments may be implemented by using software, hardware, firmware, or any combination thereof. When software is used to implement embodiments, all or a part of the embodiments may be implemented in a form of a computer program product. The computer program product includes one or more computer instructions. When the computer program instructions are loaded and executed on a computer, the procedure or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by the computer, or a data storage device, for example, a server or a data center, integrating one or more usable media. The available medium may be a magnetic medium (e.g., a floppy disk, a hard disk, or a magnetic tape), an optical medium (e.g., a digital video disc (DVD)), a semiconductor medium (e.g., a solid state disk (SSD)), or the like.

What is claimed is:

1. A beat frequency signal processing method comprising:
obtaining a beat frequency signal by performing frequency mixing on a local-frequency signal and an echo signal, wherein the local-frequency signal is one signal of a frequency-modulated signal of a radar system, and wherein the echo signal is based on reflection of a second signal that is of the frequency-modulated signal and that travels to a target object;
determining a two-dimensional (2D) time frequency spectrogram of the beat frequency signal based on a time domain signal of the beat frequency signal, wherein the 2D time frequency spectrogram indicates a relationship between a frequency and a time of the beat frequency signal;
determining a target 2D time frequency spectrogram by performing matching between the 2D time frequency spectrogram of the beat frequency signal and a plurality of theoretical 2D time frequency spectrograms, wherein the target 2D time frequency spectrogram is a theoretical 2D time frequency spectrogram whose matching degree is greater than or equal to a preset threshold among the plurality of theoretical 2D time frequency spectrograms, and wherein the plurality of theoretical 2D time frequency spectrograms are 2D time frequency spectrograms of the beat frequency signal, under combinations of a plurality of flight times and a plurality of Doppler frequency offsets, that are based on a frequency sweep curve of the frequency-modulated signal; and
obtaining a distance and a speed of the target object based on a flight time and a Doppler frequency offset that correspond to the target 2D time frequency spectrogram.

2. The beat frequency signal processing method according to claim 1, wherein determining the 2D time frequency spectrogram of the beat frequency signal based on the time domain signal of the beat frequency signal comprises:
segmenting the time domain signal of the beat frequency signal to obtain N sequences, wherein N is a preset positive integer, and wherein each of the N sequences comprises a plurality of sampling points;
performing a time-frequency transform on each of the N sequences to obtain N frequency spectrograms; and
storing the N frequency spectrograms in a time sequence corresponding to the N sequences, to obtain the 2D time frequency spectrogram of the beat frequency signal.

3. The beat frequency signal processing method according to claim 2, wherein segmenting the time domain signal of the beat frequency signal to obtain the N sequences comprises segmenting a sampled sequence of the beat frequency signal to obtain N sequences s(n), wherein the sequence is $s_l(n)=s[(l-1)\cdot M+n]$, $0\leq n<M$, $0\leq l<N$, M is a quantity of sampling points of one sequence $s_l(n)$, and wherein M is a positive integer.

4. The beat frequency signal processing method according to claim 3, wherein performing time frequency transform on each of the N sequences to obtain the N frequency spectrograms comprises performing a fast Fourier transform (FFT) on each sequence s(n) of the N sequences to obtain N frequency spectrograms $S_l(k)$, wherein $S_l(k)=F[s_l(n)]$, $0\leq k<M$, and F[ ] indicates an FFT operation, wherein storing the N frequency spectrograms in the time sequence corresponding to the N sequences to obtain the 2D time frequency spectrogram of the beat frequency signal comprises storing the N frequency spectrograms $S_l(k)$ in the time sequence corresponding to the N sequences to obtain a 2D time frequency spectrogram T(l, k) of the beat frequency signal, wherein l is a time sequence number, and wherein k is a frequency sequence number.

5. The beat frequency signal processing method according to claim 2, wherein N is based on linearity corresponding to a time when the frequency-modulated signal is generated.

6. The beat frequency signal processing method according to claim 1, further comprising:
determining combinations of a plurality of different flight times and a plurality of Doppler frequency offsets based on a measurable flight time range of the radar system and a preset first step, and based on a measurable Doppler frequency offset range of the radar system and a preset second step;
calculating beat frequency curves $f_{best}(t, \tau, f_d)$ under the combinations of the plurality of flight times and the plurality of Doppler frequency offsets based on the frequency sweep curve $f_{est}(t)$ of the frequency-modulated signal by using the following formula:

$$f_{best}(t,\tau,f_d)=f_{est}(t)-[f_{est}(t-\tau)+f_d],$$

wherein $\tau$ is the flight time, and $f_d$ is the Doppler frequency offset; and
converting each beat frequency curve $f_{best}(t, \tau, f_d)$ into a 2D time frequency spectrogram $M_{f_d,\tau}(l, k)$ whose size is $N_t \times N_f$ to obtain a plurality of theoretical 2D time frequency spectrograms $M_{f_d,\tau}(l, k)$, wherein $0\leq l<N_t$, $0\leq k<N_f$, l is a time sequence number, $N_t$ is a quantity of time sequence numbers, k is a frequency sequence number, and $N_f$ is a length of the frequency sequence number.

7. The beat frequency signal processing method according to claim 1, wherein performing matching between the 2D time frequency spectrogram of the beat frequency signal and the plurality of theoretical 2D time frequency spectrograms to determine the target 2D time frequency spectrogram comprises:

determining a matching degree between the 2D time frequency spectrogram of the beat frequency signal and each of the plurality of theoretical 2D time frequency spectrograms; and determining, as the target 2D time frequency spectrogram, a theoretical 2D time frequency spectrogram whose matching degree is greater than or equal to the preset threshold.

8. The beat frequency signal processing method according to claim 7, wherein determining the matching degree between the 2D time frequency spectrogram of the beat frequency signal and each of the plurality of theoretical 2D time frequency spectrograms comprises:

performing size conversion on the 2D time frequency spectrogram $T(l, k)$ of the beat frequency signal to obtain a 2D time frequency spectrogram $\hat{T}(l, k)$ of the beat frequency signal whose size is $N_t \times N_f$, wherein $0 \leq l < N_t$, $0 \leq l < N_f$, l is a time sequence number, $N_t$ is a quantity of time sequence numbers, k is a frequency sequence number, and $N_f$ is a length of the frequency sequence number;

calculating, by using the following formula, a matching degree $M_{rf}(\tau, f_d)$ between each theoretical 2D time frequency spectrogram $M_{f_d,\tau}(l, k)$ and a size-converted 2D time frequency spectrogram $\hat{T}(l, k)$ of the beat frequency signal:

$$M_{rf}(\tau, f_d) = \Sigma_{k=0}^{N_f-1} \Sigma_{l=0}^{N_t-1} \hat{T}(l,k) \cdot M_{f_d,\tau}(l,k); \text{ and}$$

determining the calculated matching degree $M_{rf}(\tau, f_d)$ as the matching degree between the 2D time frequency spectrogram of the beat frequency signal and each of the plurality of theoretical 2D time frequency spectrograms.

9. The beat frequency signal processing method according to claim 7, wherein determining the matching degree between the 2D time frequency spectrogram of the beat frequency signal and each of the plurality of theoretical 2D time frequency spectrograms comprises:

calculating a frequency $f_{best}(l \cdot \Delta t, \tau, f_d)$ of each sequence corresponding to each beat frequency curve $f_{best}(t, \tau, f_d)$, wherein $\Delta t$ is duration of each sequence;

converting the frequency $f_{best}(l \cdot \Delta t, \tau, f_d)$ of each sequence into an integer multiple of a frequency resolution $\Delta f$ of a 2D time frequency spectrogram $T(l, k)$ of the beat frequency signal by using the following formula to obtain $k_{l,\tau,fd}$:

$$K_{l,\tau,fd} = \text{round}(f_{best}(l \cdot \Delta t, \tau, f_d)/\Delta f), \text{ wherein}$$

$\Delta f = 1/\Delta t$, and round ( ) indicates rounding;

calculating a matching degree $Q_{rf}(\tau, f_d)$ between $f_d$, $\tau$ and $k_{l,\tau,fd}$ corresponding to each beat frequency curve $f_{best}(t, \tau, f_d)$ by using the following formula:

$$Q_{rf}(\tau, f_d) = \Sigma_{l=0}^{N_T}(l, k_{l,\tau,fd}); \text{ and}$$

determining the calculated matching degree $Q(t, f_d)$ as the matching degree between the 2D time frequency spectrogram of the beat frequency signal and each of the plurality of theoretical 2D time frequency spectrograms.

10. The beat frequency signal processing method according to claim 6, further comprising:

performing phase estimation on the time domain signal of the beat frequency signal to obtain a phase sequence $\varphi_{ref}(n)$ of the beat frequency signal; and calculating a frequency sweep curve $f_{est}(n)$ of the frequency-modulated signal based on the phase sequence $\varphi_{ref}(n)$ of the beat frequency signal by using the following formula:

$$f_{est}(n) = \varphi_{ref}(n)/2\pi\tau_{ref}, \text{ wherein}$$

$T_{ref}$ is a delay difference between two optical fibers in the radar system.

11. An apparatus comprising:
a memory configured to store instructions; and
a processor coupled to the memory and configured to execute the instructions to cause the apparatus to:

obtain a beat frequency signal by performing frequency mixing on a local-frequency signal and an echo signal, wherein the local-frequency signal is one signal of a frequency-modulated signal of a radar system and wherein the echo signal is based on reflection of a second signal that is of the frequency-modulated signal and that travels to a target object;

determine a two-dimensional (2D) time frequency spectrogram of the beat frequency signal based on a time domain signal of the beat frequency signal, wherein the 2D time frequency spectrogram indicates a relationship between a frequency and a time of the beat frequency signal;

determine a target 2D time frequency spectrogram by performing matching between the 2D time frequency spectrogram of the beat frequency signal and a plurality of theoretical 2D time frequency spectrograms, wherein the target 2D time frequency spectrogram is a theoretical 2D time frequency spectrogram whose matching degree is greater than or equal to a preset threshold among the plurality of theoretical 2D time frequency spectrograms, and q wherein the plurality of theoretical 2D time frequency spectrograms are 2D time frequency spectrograms of the beat frequency signal, under combinations of a plurality of flight times and a plurality of Doppler frequency offsets, that are based on a frequency sweep curve of the frequency-modulated signal; and obtain a distance and a speed of the target object based on a flight time and a Doppler frequency offset that correspond to the target 2D time frequency spectrogram.

12. The apparatus according to claim 11, wherein determine the 2D time frequency spectrogram of the beat frequency signal based on the time domain signal of the beat frequency signal comprises:

segment the time domain signal of the beat frequency signal to obtain N sequences, wherein N is a preset positive integer, and wherein each of the N sequences comprises a plurality of sampling points;

perform a time-frequency transform on each of the N sequences to obtain N frequency spectrograms; and store the N frequency spectrograms in a time sequence corresponding to the N sequences, to obtain the 2D time frequency spectrogram of the beat frequency signal.

13. The apparatus according to claim 12, wherein segment the time domain signal of the beat frequency signal to obtain the N sequences comprises segment a sampled sequence of the beat frequency signal to obtain N sequences s (n), wherein the sequence is $s_l(n) = s[(l-1) \cdot M + n]$, $0 \leq n < M$, $0 \leq l < N$, M is a quantity of sampling points of one sequence $s_l(n)$, and M is a positive integer.

14. The apparatus according to claim 13, wherein perform time frequency transform on each of the N sequences to obtain the N frequency spectrograms comprises:
   perform a fast Fourier transform (FFT) on each sequence $s_i(n)$ of the N sequences to obtain N frequency spectrograms $S_i(k)$, wherein $S_i(k)=F[s_i(n)]$, $0 \le k < M$, and F[ ] indicates an FFT operation, and
   wherein store the N frequency spectrograms in a time sequence corresponding to the N sequences, to obtain the 2D time frequency spectrogram of the beat frequency signal comprises
   store the N frequency spectrograms $S_i(k)$ in the time sequence corresponding to the N sequences to obtain a 2D time frequency spectrogram T(l, k) of the beat frequency signal, wherein l is a time sequence number, and wherein k is a frequency sequence number.

15. The apparatus according to claim 12, wherein N is based on linearity corresponding to a time when the frequency-modulated signal is generated.

16. The apparatus according to claim 11, wherein the instructions further cause the apparatus to:
   determine combinations of a plurality of different flight times and a plurality of Doppler frequency offsets based on a measurable flight time range of the radar system and a preset first step, and based on a measurable Doppler frequency offset range of the radar system and a preset second step;
   calculate beat frequency curves $f_{best}(t, \tau, f_d)$ under the combinations of the plurality of flight times and the plurality of Doppler frequency offsets based on the frequency sweep curve $f_{est}(t)$ of the frequency-modulated signal by using the following formula:

$$f_{best}(t,\tau,f_d)=f_{est}(t)-[f_{est}(t-\tau)+f_d],$$

wherein $\tau$ is the flight time, and fa is the Doppler frequency offset; and
   convert each beat frequency curve $f_{best}(t, \tau, f_d)$ into a 2D time frequency spectrogram $M_{f_d,\tau}(l, k)$ whose size is $N_t \times N_f$ to obtain a plurality of theoretical 2D time frequency spectrograms $M_{f_d,\tau}(l, k)$, wherein $0 \le l < N_t$, $0 \le k < N_f$, l is a time sequence number, $N_t$ is a quantity of time sequence numbers, k is a frequency sequence number, and $N_f$ is a length of the frequency sequence number.

17. The apparatus according to claim 11, wherein perform matching between the 2D time frequency spectrogram of the beat frequency signal and the plurality of theoretical 2D time frequency spectrograms to determine a target 2D time frequency spectrogram comprises:
   determine a matching degree between the 2D time frequency spectrogram of the beat frequency signal and each of the plurality of theoretical 2D time frequency spectrograms; and
   determine, as the target 2D time frequency spectrogram, a theoretical 2D time frequency spectrogram whose matching degree is greater than or equal to the preset threshold.

18. The apparatus according to claim 17, wherein determine the matching degree between the 2D time frequency spectrogram of the beat frequency signal and each of the plurality of theoretical 2D time frequency spectrograms comprises:
   perform size conversion on a 2D time frequency spectrogram T(l, k) of the beat frequency signal to obtain a 2D time frequency spectrogram $\hat{T}(l, k)$ of the beat frequency signal whose size is $N_t \times N_f$, wherein $0 \le l < N_t$, $0 \le k < N_f$, l is a time sequence number, $N_t$ is a quantity of time sequence numbers, k is a frequency sequence number, and $N_f$ is a length of the frequency sequence number;
   calculate, by using the following formula, a matching degree $M_{rf}(\tau, f_d)$ between each theoretical 2D time frequency spectrogram $M_{f_d,\tau}(l, k)$ and a size-converted 2D time frequency spectrogram $\hat{T}(l, k)$ of the beat frequency signal:

$$M_{rf}(\tau,f_d)=\Sigma_{k=0}^{N_f-1}\Sigma_{l=0}^{N_t-1}\hat{T}(l,k) \cdot M_{f_d,\tau}(l,k); \text{ and}$$

determine the calculated matching degree $M_{rf}(\tau, f_d)$ as the matching degree between the 2D time frequency spectrogram of the beat frequency signal and each of the plurality of theoretical 2D time frequency spectrograms.

19. The apparatus according to claim 17, wherein determine the matching degree between the 2D time frequency spectrogram of the beat frequency signal and each of the plurality of theoretical 2D time frequency spectrograms comprises:
   calculate a frequency $f_{best}(l \cdot \Delta t, \tau, f_d)$ of each sequence corresponding to each beat frequency curve $f_{best}(t, \tau, f_d)$, wherein $\Delta t$ is duration of each sequence;
   convert the frequency $f_{best}(l \cdot \Delta t, \tau, f_d)$ of each sequence into an integer multiple of a frequency resolution $\Delta f$ of a 2D time frequency spectrogram T (l, k) of the beat frequency signal by using the following formula to obtain $k_{l,\tau,fd}$:

$$k_{l,\tau,fd}=\text{round}(f_{best}(l \cdot \Delta t,\tau,fd)/\Delta f), \text{ wherein}$$

$\Delta f=1/\Delta t$, and round ( ) indicates rounding;
   calculate a matching degree $Q_{rf}(t, f_d)$ between $f_d$, $\tau$ and $k_{l,\tau,fd}$ corresponding to each beat frequency curve $f_{best}(t, \tau, f_d)$ by using the following formula:

$$Q_{rf}(\tau,f_d)=\Sigma_{l=0}^{N}T(l,k_{l,\tau,fd}); \text{ and}$$

determine the calculated matching degree $Q(\tau, f_d)$ as the matching degree between the 2D time frequency spectrogram of the beat frequency signal and each of the plurality of theoretical 2D time frequency spectrograms.

20. The apparatus according to claim 16, wherein the instructions further cause the apparatus to:
   perform phase estimation on the time domain signal of the beat frequency signal to obtain a phase sequence $\varphi_{ref}(n)$ of the beat frequency signal; and
   calculate a frequency sweep curve $f_{est}(n)$ of the frequency-modulated signal based on the phase sequence $\varphi_{ref}(n)$ of the beat frequency signal by using the following formula:

$$f_{est}(n)=\varphi_{ref}(n)/2\pi\tau_{ref}, \text{ wherein}$$

$\tau_{ref}$ is a delay difference between two optical fibers in the radar system.

21. A radar comprising:
   a transmitter configured to transmit a detection signal to a target object;
   a receiver configured to receive an echo signal that is based on reflection by the target object; and
   a beat frequency signal processing apparatus comprising:
      a memory configured to store instructions; and
      a processor coupled to the memory and configured to execute the instructions to cause the beat frequency signal processing apparatus to:
         obtain a beat frequency signal by performing frequency mixing on a local-frequency signal and an echo signal, wherein the local-frequency signal is one signal of a frequency-modulated signal of a radar system and wherein the echo signal is based on reflection of a second signal that is of the frequency-modulated signal and that travels to a target object;

determine a two-dimensional (2D) time frequency spectrogram of the beat frequency signal based on a time domain signal of the beat frequency signal, wherein the 2D time frequency spectrogram indicates a relationship between a frequency and a time of the beat frequency signal;

determine a target 2D time frequency spectrogram by performing matching between the 2D time frequency spectrogram of the beat frequency signal and a plurality of theoretical 2D time frequency spectrograms to, wherein the target 2D time frequency spectrogram is a theoretical 2D time frequency spectrogram whose matching degree is greater than or equal to a preset threshold among the plurality of theoretical 2D time frequency spectrograms, and wherein the plurality of theoretical 2D time frequency spectrograms are 2D time frequency spectrograms of the beat frequency signal, under combinations of a plurality of flight times and a plurality of Doppler frequency offsets, that are based on a frequency sweep curve of the frequency-modulated signal; and obtain a distance and a speed of the target object based on a flight time and a Doppler frequency offset that correspond to the target 2D time frequency spectrogram.

* * * * *

UNITED STATES PATENT AND TRADEMARK OFFICE
CERTIFICATE OF CORRECTION

Page 1 of 2

PATENT NO. : 12,386,054 B2
APPLICATION NO. : 17/948446
DATED : August 12, 2025
INVENTOR(S) : Qiang Li It is certified that error appears in the above-identified patent and that said Letters Patent is hereby corrected as shown below:

In the Claims

Claim 3, Column 30, Line 18 "to obtain N sequences s(n),"
Should read "to obtain N sequences $s_l(n)$,"

Claim 4, Column 30, Line 26 "on each sequence s(n) of the N"
Should read "on each sequence $s_l(n)$ of the N"

Claim 8, Column 31, Line 19 "2D time frequency spectrogram T(l,k) of the"
Should read "2D time frequency spectrogram $\hat{T}(l,k)$ of the"

Claim 8, Column 31, Line 21 "$0 \leq l < N_t$, $0 \leq l < N_f$, $l$ is a time sequence number"
Should read "$0 \leq l < N_t$, $0 \leq k < N_f$, $l$ is a time sequence number"

Claim 9, Column 31, Line 53 "and round ( ) indicates rounding;"
Should read "and round(⌞⌟) indicates rounding:"

Claim 13, Column 32, Line 64 "to obtain N sequences s (n),"
Should read "to obtain N sequences $s_l(n)$,"

Claim 16, Column 33, Line 35 "and fa is the Doppler frequency"
Should read "and $f_d$ is the Doppler frequency"

Claim 16, Column 33, Line 40 "wherein $0 \leq l << N_t$, $0 \leq k < N_f$"
Should read "wherein $0 \leq l < N_t$, $0 \leq k < N_f$"

Claim 18, Column 34, Line 9 "$M_{rf}(\tau, f_d) = \sum_{k=0}^{N_t-1} \sum_{l=0}^{N_t-1} \hat{T}(l,k) \cdot M_{f_d,\tau}(l,k)$,"

Signed and Sealed this
Seventh Day of October, 2025

John A. Squires
*Director of the United States Patent and Trademark Office*

Should read "$M_{rf}(\tau, f_d) = \sum_{k=0}^{N_f-1} \sum_{l=0}^{N_t-1} \hat{T}(l,k) \cdot M_{f_d,\tau}(l,k)$,"

Claim 19, Column 34, Line 31 "and round ( ) indicates rounding;"
Should read "and round( ⬚ ) indicates rounding:

Claim 19, Column 34, Line 33 "calculate a matching degree $Q_{rf}(t, f_d)$"
Should read "calculate a matching degree $Q_{rf}(\tau, f_d)$"